US009112809B2

(12) United States Patent
Karlsson et al.

(10) Patent No.: US 9,112,809 B2
(45) Date of Patent: Aug. 18, 2015

(54) METHOD AND APPARATUS FOR CONTROLLING UTILIZATION IN A HORIZONTALLY SCALED SOFTWARE APPLICATION

(71) Applicant: Telefonaktiebolaget LM Ericsson (publ), Stockholm (SE)

(72) Inventors: Pär Karlsson, Karlskrona (SE); Mikael Kaspersson, Karlskrona (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 443 days.

(21) Appl. No.: 13/683,549

(22) Filed: Nov. 21, 2012

(65) Prior Publication Data

US 2014/0143300 A1  May 22, 2014

(51) Int. Cl.
| | |
|---|---|
| H04L 12/24 | (2006.01) |
| H04L 29/08 | (2006.01) |
| H04L 12/26 | (2006.01) |
| H04L 12/801 | (2013.01) |
| H04L 12/813 | (2013.01) |

(52) U.S. Cl.
CPC .......... *H04L 41/5009* (2013.01); *H04L 43/026* (2013.01); *H04L 43/0876* (2013.01); *H04L 47/10* (2013.01); *H04L 67/101* (2013.01); *H04L 41/5022* (2013.01); *H04L 47/20* (2013.01); *Y02B 60/33* (2013.01)

(58) Field of Classification Search
CPC ............ H04L 41/5009; H04L 41/5022; H04L 43/026; H04L 43/0876; H04L 47/10
USPC ......................................................... 709/203
See application file for complete search history.

(56) References Cited

U.S. PATENT DOCUMENTS

| | | | | |
|---|---|---|---|---|
| 4,009,344 | A * | 2/1977 | Flemming | 370/321 |
| 8,549,192 | B2 * | 10/2013 | Nakamura et al. | 710/29 |
| 8,606,899 | B1 * | 12/2013 | Ryner et al. | 709/223 |
| 8,738,774 | B2 * | 5/2014 | Sheng et al. | 709/225 |
| 2004/0008627 | A1 * | 1/2004 | Garg et al. | 370/235 |
| 2004/0064557 | A1 * | 4/2004 | Karnik et al. | 709/225 |

(Continued)

OTHER PUBLICATIONS

Unknown Author, "Gossip Protocol," Wikipedia, The Free Encyclopedia, Last modified Sep. 13, 2012, pp. 1-6.

(Continued)

*Primary Examiner* — Jerry Dennison
*Assistant Examiner* — Dixon Dabipi
(74) *Attorney, Agent, or Firm* — Murphy, Bilak & Homiller, PLLC

(57) ABSTRACT

The present invention comprises an apparatus and method for distributed traffic control in a horizontally scaled application, in which a software-based application is implemented as a number of peer application instances that each provide a portion of the application's overall capability or capacity. An apparatus that includes a distributed traffic controller is instantiated or otherwise implemented at each application instance, and these apparatuses collectively operate to limit the overall utilization of the application by individual clients or affiliated groups of clients according to, e.g., Service Level Agreements or SLAs, and further operate to prevent disproportionate utilization of any one of the application instances. Advantageously, such operations are accomplished according to the teachings herein using efficient information propagation protocols between the distributed traffic controllers.

20 Claims, 17 Drawing Sheets

(56) References Cited

U.S. PATENT DOCUMENTS

2007/0156842 A1* 7/2007 Vermeulen et al. ............ 709/217
2009/0319404 A1* 12/2009 Duchamp ....................... 705/30

OTHER PUBLICATIONS

Unknown Author, "Token Bucket," Wikipedia, The Free Encyclopedia, Last modified May 10, 2012, pp. 1-4.
Renesse, et al. "Efficient Reconciliation and Flow Control for Anti-Entropy Protocols," Second Workshop on Large-Scale Distributed Systems and Middleware (LADIS 2008). Yorktown Heights, NY, 2008, pp. 1-7.
Bailly, Francis et al., "Biological Organization and Anti-Entropy," Journal of Biological Systems, vol. 18, Issue 01, Mar. 2009, pp. 1-31.
Kim, Han Seok et al., "A Token-Bucket Based Rate Control Algorithm with Maximum and Minimum Rate Constraints," Institute of Electronics, Information and Communication Engineers, vol. E91-B; Issue No. 5; May 2008, pp. 1623-1626.
Taghavianfar, M., "An Investigation on Gossiping Protocols and Network Entropy," Master Thesis; Mathematical Modelling and Simulation. Nov. 2012. pp. i-50.

* cited by examiner

METHOD AND APPARATUS FOR CONTROLLING UTILIZATION IN A HORIZONTALLY SCALED SOFTWARE APPLICATION

TECHNICAL FIELD

The present invention generally relates to distributed processing, and particularly relates to horizontally scaled processing systems.

BACKGROUND

In a horizontally scaled system of the type contemplated herein, an overall software application is realized in a number of peer application instances, each providing full functionality of the application and each representing a portion of an overall application capacity or performance capability. However, existing solutions for managing the application traffic from a pool of clients are based on a number of assumptions that generally do not hold for horizontally scaled systems.

Such operation results from conventional assumptions that traffic control for the pool of clients is performed in a single instance, e.g., the whole system is built up by a single hardware server and that all traffic is routed though a single point, at which point the traffic can be observed and controlled. However, in horizontally scaled systems, hardware and/or software instances can come and go at arbitrary points in time, e.g., due to failures, upgrades, etc.

Perhaps more critically, the distribution of traffic from a pool of clients to peer application instances within a horizontally scaled application may result in some application instances being over-utilized while some application instances are under-utilized. For example, given clients, or at least given connections originating from the same client context, may be "stickier" than others. In this regard, a "sticky" connection is persistent and is associated with continuing application traffic.

It is recognized herein that assigning application traffic incoming from a pool of different clients to respective ones in a round-robin "load distribution" approach does not account for the fact that sticky connections arising from the distributed application traffic may accumulate at one or more of the application instances. Further, synchronizing the state of traffic control parameters among the peer application instances can be costly in regards to available network bandwidth and the number of messages needed to reach and/or maintain a synchronized state.

SUMMARY

The present invention comprises an apparatus and method for distributed traffic control in a horizontally scaled application, in which a software-based application is implemented as a number of peer application instances that each provide a portion of the application's overall capability or capacity. An apparatus that includes a distributed traffic controller is instantiated or otherwise implemented at each application instance, and these apparatuses collectively operate to limit the overall utilization of the application by individual clients or affiliated groups of clients according to, e.g., Service Level Agreements or SLAs, and further operate to prevent disproportionate utilization of any one of the application instances. Advantageously, such operations are accomplished according to the teachings herein using efficient information propagation protocols between the distributed traffic controllers.

In a more detailed example, the teachings herein disclose a method of controlling a utilization of a software application by an individual client. The application is implemented as a number of peer application instances that receive application traffic from any one or more clients in a plurality of clients and wherein the method is implemented at each application instance.

With that understanding, the method includes classifying the application traffic incoming to the application instance into flows corresponding to different ones of the clients and/or different types of application traffic, and estimating a local demand value for each flow with respect to the application instance. The method further includes exchanging local demand information with one or more other ones of the application instances. The exchange includes sending the local demand values estimated for the flows at the application instance and receiving like estimated local demand values for all like flows at other ones of the application instances.

According to the method, the exchanged local demand information is used at each application instance to determine a global demand value for each flow at the application instance. The global demand values are determined with respect to the application. In this sense, the global demand value determined for a given flow at a given application instance can be understood, in a non-limiting example, as the summation of the local demand value estimated for that flow at the application instance and the local demand values estimated for all like flows at the other application instances.

Advantageously, the method continues with using the global demand value determined for each flow to calculate a local utilization limit for the flow at the application instance.

Correspondingly, the method further includes marking the application traffic in each flow as being out-of-policy traffic or as being in-policy traffic, in dependence on whether or not the local utilization limit for the flow is exceeded. This operation may be understood as a first level of policing, in which per-flow utilization limits are applied.

As a second step or level of policing, the method additionally includes determining whether an aggregation of the application traffic for all flows at the application instance exceeds a local aggregated utilization limit. According to the method, buffering of the aggregated application traffic toward the application instance is controlled based on whether the local aggregated utilization limit is or is not exceeded and/or based on distinguishing between the in-policy and the out-of-policy traffic. For example, while an individual flow may be constrained responsive to out-of-policy traffic, it also may be that the buffering of aggregated application traffic involves applying different buffering priorities to in-policy and out-of-policy traffic, at least during times when the local aggregated utilization limit is exceeded.

The above method, and variations or extensions of it, is implemented in one or more embodiments taught herein using an apparatus that comprises a distributed traffic controller and a communication controller. The apparatus may be software-based, e.g., realized as logical or functional circuitry according to the execution of computer program instructions stored in a computer-readable medium. In an example case, the apparatus is implemented as part of each application instance, or as a companion program executing in conjunction with the application instance within the host operating system environment.

In an example configuration, the distributed traffic controller classifies application incoming to its associated application instance into flows and applies a first level of token-bucket based policing on each flow. That is, a per-flow token bucket policing scheme is applied to the traffic in each flow, to mark application traffic in the flow as in-policy or out-of-policy in dependence on whether local utilization limits for the flow are exceeded, and optionally to apply a first level of traffic regulation on a per-flow basis, e.g., by dropping some of the application traffic from the flow.

These per flow utilization limits are determined from the local demand values estimated by the distributed traffic controller for the flows at the application instance with which the distributed traffic controller is paired, and from the local demand values estimated by the other distributed traffic controllers at the other application instances, for all like flows. That is, each flow at each application instance is defined by its classification parameters—e.g., traffic type, client domain, etc.—and any flow at another application instance having the same classification parameters is a like flow. Thus, the overall or global demand associated with any given flow depends on the local demands of all like flows, across all application instances.

The communication controllers paired with the distributed traffic controllers exchange local demand information and thus provide for the propagation of local demand values among all of the distributed traffic controllers, thereby enabling the calculation of accurate global demand values and the dynamic adjustment of local utilization limits on a per flow basis, in consideration of the corresponding flow demands at all other application instances.

As a further advantage, each distributed traffic controller applies a second level of policing on the aggregation of application traffic at each application instance—i.e., the aggregated flow combining all individual flows at the application instance. Policing at the aggregated level may involve selective regulation of the aggregated flow, in dependence on whether local aggregated utilization limits are or are not exceeded.

An effect of the invention according to the independent claims is that the proportion of capacity or other application resource that is permitted for a given flow at a given application instance changes as a function of the global demand associated with that flow. Of course, the present invention is not limited to these or the other foregoing features and advantages. Indeed, those skilled in the art will recognize additional features and advantages upon reading the following detailed description, and upon viewing the accompanying drawings.

DETAILED DESCRIPTION

Figure 1:
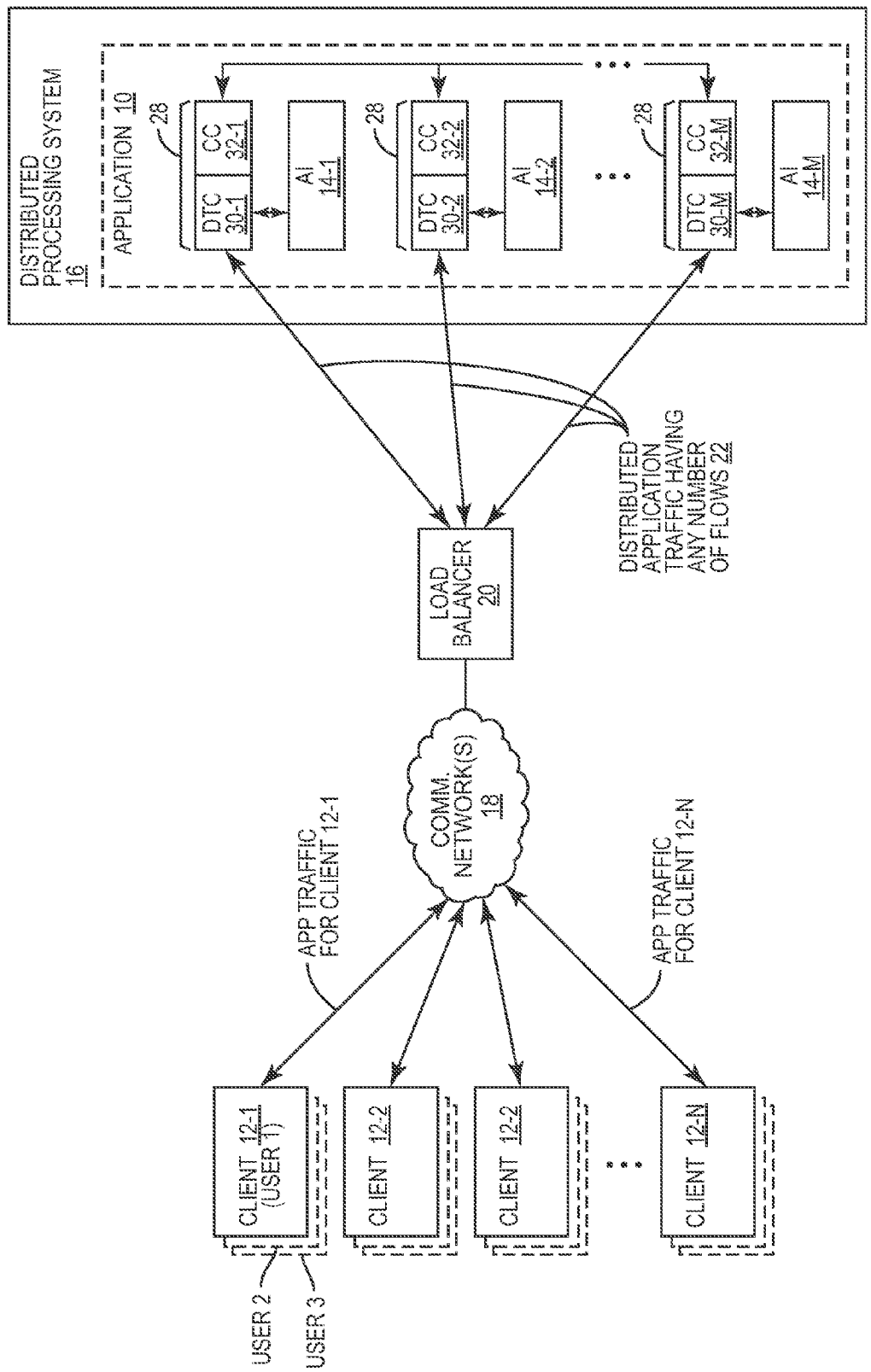
FIG. 1 is a block diagram of one embodiment of a distributed processing system implementing a horizontally scaled application.

FIG. 1 illustrates a software-based application 10, referred to as the "application 10" in this discussion. A pool of clients 12-1, 12-2, etc., use the application 10, and it will be understood that each client 12-1, 12-2, etc., will, when using the application 10, consume a certain portion of its overall capacity or capability. For ease of reference, the reference number 12 is used without suffixing to refer generically to any one or more of the clients 12-1, 12-2, etc. Thus, the terms "client 12" and "clients 12" respectively refer to any one of the clients and to any two or more of the clients.

Further, the term client is an "overloaded" term as used herein. In general, a client 12 comprises some software component instance—as instantiated in a computing device or system—that generates one or more type of application traffic toward the application 10. An example client 12 might generate several different message types, e.g., create, read, update, etc., and each message type can be seen as a separate traffic "flow" with respect to the application 10, with each such flow possibly governed by a Service Level Agreement or SLA, negotiated between the organization providing the application 10 and a subscribing organization making use of the application via one or more clients 12. Multiple users affiliated with the subscribing organization may run multiple like clients 12 or multiple different types of clients 12, each making use of the application 10 according to SLA terms applicable to the collective utilization of the application 10 by all such clients 12.

With the above referencing scheme in mind, one sees that the application 10 is implemented as a number of peer application instances 14-1, 14-2, etc. Unless suffixing is required for clarity, this discussion will use the term "application instance 14" to refer generically to any given one of the application instances 14-1, 14-2, etc., and will similarly use the term "application instances 14" to refer to any given two or more of the application instances 14-1, 14-2, etc.

Each application instance 14 operates as a copy of the application 10 and thus provides the full functionality of the application 10, but provides only a portion of the overall application capability or capacity. The full capability or capacity, which may be measured in terms of transactions per second, etc., is represented in horizontally scaled form by the collection of peer application instances 14. The application 10 collectively, and each application instance 14, will be understood as comprising or being represented by a functional circuit configuration realized in digital processing circuitry and associated memory on one or more computer systems, e.g., servers running an operating system in which the application instances 14 execute. The figure depicts this processing circuitry in a collective sense, referred to as a "distributed processing system 16."

Individual ones of the clients 12 communicate with individual ones of the application instances 14 via communicative coupling through one or more computer networks 18—e.g., one or more public or private data networks, which may include the Internet, and which may include Virtual Private Network (VPN) connections supported therein. Each client 12 sends application traffic toward the application 10, where such traffic comprises request messages for example, sent according to a defined protocol. A load balancer 20 receives the application traffic incoming from the pool of clients 12 and distributes it to respective ones of the application instances 14 using, e.g., a round-robin distribution function, where each new application message, or batch thereof, incoming to the load balancer 20 is distributed to a next one of the application instances 14.

Consequently, the application traffic incoming to any one of the application instances 14 comprises any number of application traffic flows 22, as described above. That is, for any given application instance 14, the incoming application traffic may comprise messages of various types, from various ones of the clients 12.

Processing detailed later herein logically separates the application traffic incoming to each application instance 14 into individual flows 22, with each flow 22 generally representing application traffic of a given type and having a given client association. The client association may be specific, e.g., traffic from client 12-1 or 12-2, or so on, or it may be a domain-wise association, e.g., any client 12 that is associated with the same SLA or other subscription credentials giving all such clients 12 access to the application 10. In this regard, it should also be noted that the application traffic incoming to any given application instance 14 from the load balancer 20 generally is not already logically classified into flows 22—such classification is performed in conjunction with the distributed traffic control taught herein. Thus, the positioning of the label "22" in FIG. 1 is not meant to imply only that the incoming traffic includes traffic associated with any number of flows 22, as that term is defined herein.

While the traffic distribution approach taken by the load balancer 20 may "fairly" distribute initial request messages to the various application instances 14, some of those requests are quickly serviced while requests involve "sticky" or persistent connections with follow-on traffic anchored to the sticky connection. Thus, not every incoming request message or other type of traffic results in the same processing load at the receiving application instance 14. Thus, when application traffic is distributed without regard for the stickiness of that traffic, load imbalances can develop.

Because the mixed flow of application traffic from the various clients 12 to any one of the application instances 14 represents any possible combination of sticky and non-sticky transactions, each application instance 14 includes or is paired with an apparatus 28 that is configured for controlling a maximum overall utilization of the software application 10 by particular flow of application traffic. Put simply, the apparatuses 28 provide a sophisticated form of distributed traffic control for the set of application instances 14, without impeding the performance of the application 10 and without requiring extensive signaling between them.

As will be appreciated, the apparatus 28 may represent a functional circuit arrangement realized in the digital processing circuitry of the distributed processing system 16, e.g., via the execution of stored computer program instructions embodying the processing logic as described herein for the apparatus 28. As will be further appreciated, the apparatus 28 may be replicated at each one of the application instances, so that like apparatuses 28 are implemented for the respective application instances 14 comprising the overall application 10. Each such apparatus 28 may be realized within the computer program comprising the application instance 14, or may be implemented as an adjunct or "companion" program with respect to the application instance 14.

The apparatus 28 comprises a distributed traffic controller 30, which is abbreviated as "DTC" in the figure. The "DTC" abbreviation will be used hereafter, for convenience. The DTC 30 is configured to estimate a local demand value with respect to the application instance 14, for each flow 22 of application traffic at the application instance 14.

The apparatus 28 further comprises a communication controller 32, depicted in the diagram according to the abbreviation "CC." That abbreviation is used hereafter. The CC 32 is configured to exchange local demand information with one or more other ones of the application instances 14. Exchanging local demand information includes sending the local demand values estimated at the application instance 14 for each flow 22 of application traffic at the application instance 14 and receiving like estimated local demand values for like flows 22 at the other ones of the application instances 14.

As will be detailed later herein, two flows 22 of application traffic at two different application instances 14 are considered to be "like flows" if they comprise the same type of application traffic and originate from the same client 12, or from the same client domain or context. The term "domain" refers to the case where potentially many clients 12 are identified with a single subscribing entity, such that all application traffic originating from those clients 12 belongs to the same client domain or context and thus, in the aggregate, is subject to the SLA contracted by the subscribing entity. More simply, a flow 22 at one of the application instances 14 is "like" another flow 22 at another application instance 14 if the classifications of the two flows 22 are the same, e.g., both flows 22 comprise the same type of application traffic and both flows 22 are associated with the same client context.

Of further note, the logical or functional circuit separation suggested in FIG. 1 for the apparatus 28 may have certain advantages, e.g., the arrangement separates the apparatus 28 into logical controllers 30 and 32, with one such controller handling distributed traffic control at its respective application instance 14 and with the other one handling the exchange of information between apparatuses 28 to maintain state synchronization across all DTCs 30. However, a combined control circuit also may be implemented and/or other functional divisions may be used in implementing the apparatus 28. Thus, the depicted arrangement should not be construed as limiting.

The DTC 30 is further configured to determine a global demand value for each flow 22 at the application instance 14, with respect to the application 10 in an overall sense. This can be understood as assessing the local demand value for each flow 22, as determined at the application instance 14, in conjunction with evaluating the local demand values for all like flows 22 at the other application instances 14. The determination of the global demand value associated with each flow 22 is therefore based on the exchange of local demand information among the CCs 32.

The DTC 30 is further configured to: calculate a local utilization limit for each flow 22 as a function of the global demand value determined for the flow 22; mark the application traffic in each flow as being out-of-policy traffic or as being in-policy traffic, in dependence on whether or not the local utilization limit for the flow 22 is exceeded; determine whether an aggregation of the application traffic in all of the flows 22 at the application instance 14 exceeds a local aggregated utilization limit; and controlling a buffering of the aggregated application traffic toward the application instance 14 on a per-flow and/or aggregated flow basis, based on whether the local aggregated utilization limit is exceeded and distinguishing between in-policy and out-of-policy traffic.

Thus, in at least some embodiments, the DTC 30 can be understood as policing the flow of application traffic in each individual flow 22, based on using utilization (demand) information determined for the flow 22 at the DTC 30 and like flows 22 at the other application instances 14, to determine a local utilization limit for each flow 22 at the application instance 14, where the local utilization limit for the flow 22 is proportional to the overall demand represented by that flow 22 and all its like flows 22. This allows a collective policing of the application traffic for all like flows 22 across all of the application instances 14 and imposes an overall or net control of the clients' application traffic, without requiring a centralized mechanism of flow control.

In some embodiments, the DTC 30 is configured to cooperate with the CC 32 to exchange the local demand information by communicating with the one or more other ones of the application instances 14 via a gossip-based anti-entropy protocol that propagates local demand values as estimated at any one of the application instances 14 to all other ones of the application instances 14. See, e.g., Van Renesse, R., Dumitriu, D., Gough, V., & Thomas, C., "Efficient Reconciliation and Flow Control for Anti-Entropy Protocols," *Second Workshop on Large-Scale Distributed Systems and Middleware* (*LADIS* 2008), Yorktown Heights, N.Y.: ACM (ISBN: 978-1-60558-296-2). Also see Bailly F, Longo G., *Biological organization and anti-entropy*, J BiolSyst 17(1):63-96 (2009). These two references provide example details for gossip-based information exchange, and they are incorporated herein by reference.

Turning back to example details of the DTC 30, there are a number of approaches contemplated herein for estimating a local demand value for each flow 22. In a non-limiting example, the DTC 30 is configured to estimate the local demand value for each flow 22 by at least one of: counting a number of protocol sessions active at the application instance 14 for the flow 22; estimating an expected flow rate based on whether there is any new traffic in the flow 22 within a defined interval; and estimating the expected flow rate based on measuring an arrival rate application traffic in the flow 22.

Each DTC 30 is also configured to determine the global demand value for each flow 22 at its respective application instance 14. This global demand value is, of course, determined with respect to the overall application 10, and it is determined, for example, by summing the local demand value estimated for the flow 22 with the local demand values estimated for like flows 22 by the DTCs 30 at the other application instances 14. Such information is known from the exchanging of the local demand information between the DTCs 30 via the CCs 32.

As for determination of the local utilization limit for each flow 22 at any given one of the application instances 14, the corresponding DTC 30 in some embodiments is configured to calculate the local utilization limit for each flow 22 by calculating a local flow rate limit for the application traffic in the flow 22. In this regard, remember that each application instance 14 sees a mix of application traffic from the various clients 12, as dynamically distributed by the load balancer 20; thus, the DTC 30 at any given application instance may be configured to categorize or otherwise classify the incoming application traffic into different flows 22, based on traffic type, the originating identity associated with the request, etc. For example, a flow 22 can be all application requests from a given client 12 contained in a soap/http or telnet messages, where all requests have the same user identity. Each flow 22 may be associated with a certain Service Level Agreement or SLA. Thus, the DTCs 30 must operate in a decentralized manner that nonetheless honors the SLA commitments to be met by the application 10 at large, with respect to the clients 12 and their respective or combined application traffic flows 22.

Each given DTC 30 also is configured in some embodiments to calculate the local flow rate limit for the application traffic in each flow 22 by calculating the local flow rate limit as an overall maximum flow rate limit known for all like flows 22 with respect to the application 10, as scaled by a proportionality factor that is determined as the ratio of the local demand value of the flow 22 to the global demand value of that flow 22 and all of its like flows 22 at the other application instances. The overall maximum flow rate limit may come from an SLA or other preconfigured constraint and may be a configuration data item stored in a memory included in or accessible to each apparatus 28. Note, too, that the DTC 30 also may be configured to calculate the local utilization limit for flow 22 further by calculating a local burst size limit for the application traffic in the flow 22.

Thus, at each application instance 14, the application traffic incoming to the application instance 14 from the load balancer 20 may be classified into flows 22, with each such flow 22 subject to policing—e.g., maximum flow rate and/or burst size limits—and the aggregated flow of application traffic for such flows 22 at the application instance 14 is further constrained, according to aggregated utilization limits. Such operations by each DTC 30 with respect to a corresponding one of the application instances 14 allow decentralized control of application utilization in a manner that prevents individual clients 12 or affiliated pluralities of clients 12 from overloading given application instances 14, while still insuring that the application 10 meets SLA requirements with respect to those clients 12.

As for controlling the buffering of the aggregated flow of application traffic toward the application instance 14, the DTC 30 is configured in some embodiments to buffer the aggregated application traffic in one or more delay buffers and empty the one or more delay buffers toward the application instance 14 according to a prioritization scheme that in general imposes shorter buffering delays on the in-policy traffic as compared to the out-of-policy traffic.

For example, if the local aggregated utilization limit(s) are exceeded, the DTC 30 regulates that aggregated flow of application traffic toward the application instance 14, e.g., by emptying the buffer(s) according to a prioritization scheme that disfavors out-of-policy application traffic as compared to in-policy application traffic. As out-of-policy application traffic represents a localized overutilization by a given flow 22, this has the effect of throttling or damping one or more flows 22 at the application instance 14.

Of course, as noted, the DTC 30 may be further configured to prioritize any aggregated application traffic in the one or more delay buffers according to one or more service parameters defined in any SLAs applicable to the individual flows 22. Further, as noted, the marking of application traffic as being in-policy or out-of-policy is done on a per flow basis. Thus, one flow 22 may be over-utilizing the application instance 14 at a given time, such that traffic in that flow 22 is marked as out-of-policy, while traffic in another flow 22 that is under its local utilization limit is marked as in-policy traffic.

By classifying the incoming application traffic into flows 22, in conjunction with marking the application traffic of each flow 22 as being in-policy traffic or out-of-policy traffic, the DTC 30 may be further configured to throttle or selectively drop application messages in individual ones of the flows 22, as needed to maintain compliance with maximum service levels guaranteed in a corresponding SLA applicable to the flow 22. Thus, traffic shaping, selective packet dropping or other type of application traffic rate limiting or regulation may be applied at each application instance 14 for individual flows 22, as well as to the aggregated flow represented by the combination of the individual flows 22.

Figure 2:
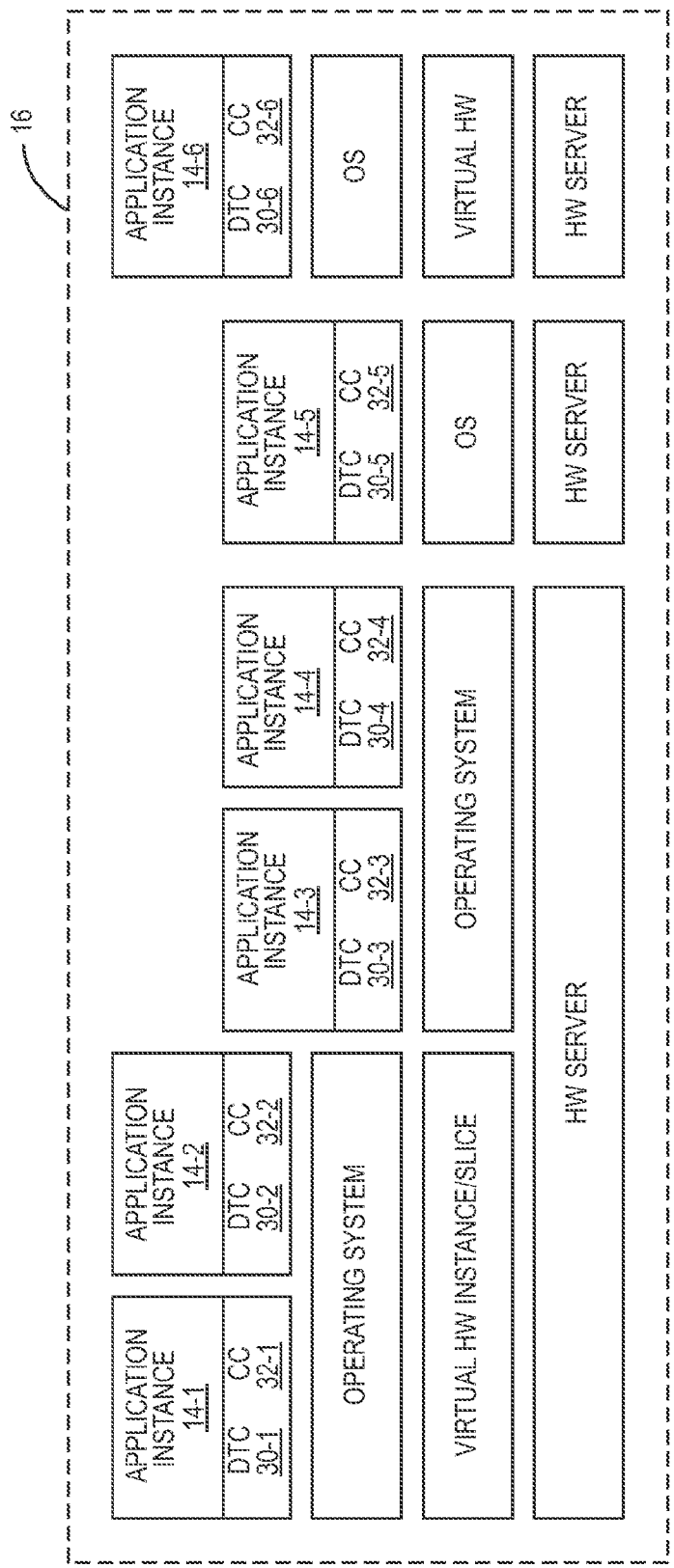
FIG. 2 is a block diagram illustrating example details for the distributed processing system of FIG. 1.

FIG. 2 illustrates that the application instances 14 and their respective apparatuses 28 may be implemented on the same or separate computing systems—e.g., the same or separate server hardware—and also may be implemented using virtualized servers. In the example diagram, the application instances 14-1 and 14-2 are implemented on a virtualized server residing on a first physical server, which provides an operating system environment for their execution. Of course, their respective apparatuses 28 reside in this same operating system environment.

The application instances 14-3 and 14-4 and their respective apparatuses 28 also reside on that same server, but they are implemented outside of the virtualized server that hosts the application instances 14-1 and 14-2. Two additional servers each host a respective one of the two additional application instances 14-5 and 14-6 shown in the illustration. These additional servers may or may not be co-located with the other server, but they are at a minimum linked communicatively, to provide for the exchange of local demand information between the CCs 32 in the respective apparatuses 28.

Figure 3:
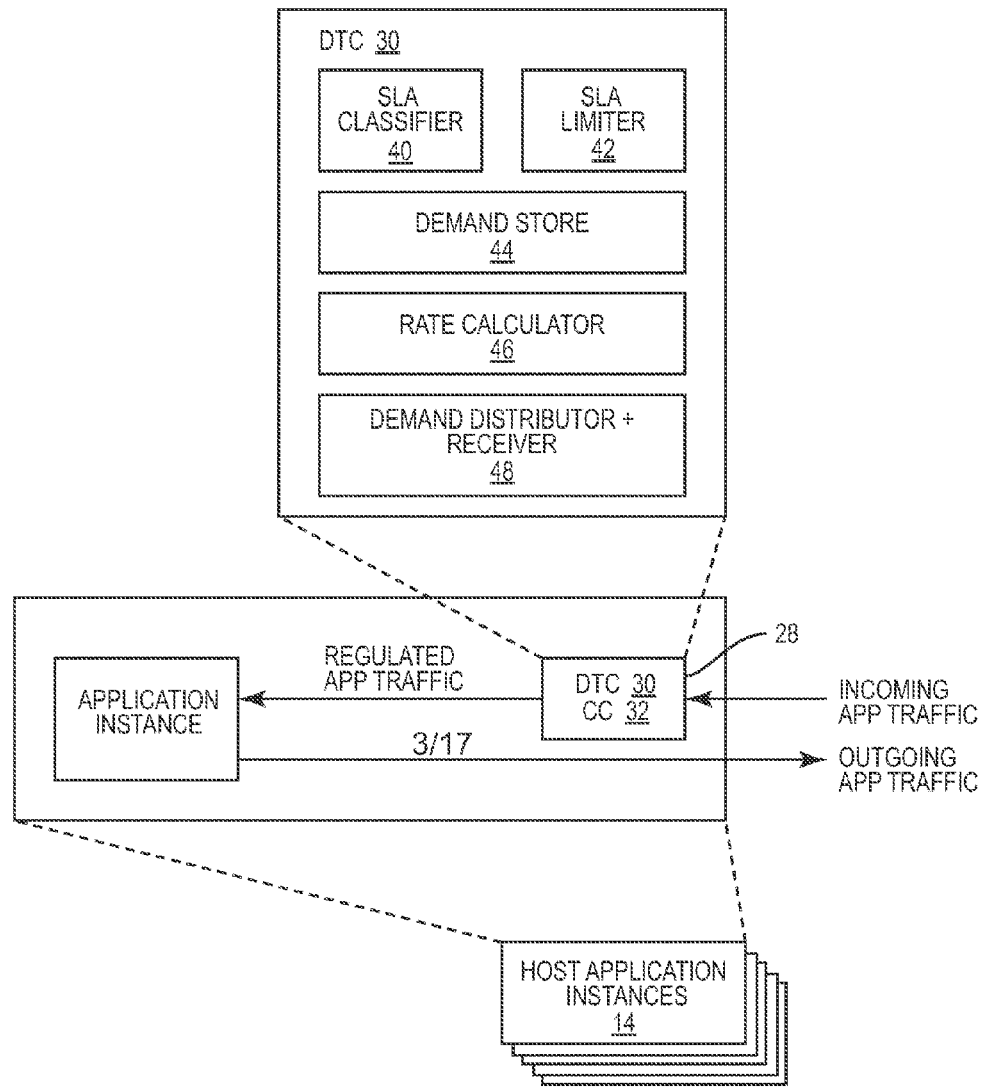
FIG. 3 is a block diagram of one embodiment of a distributed traffic controller as contemplated herein.

FIG. 3 illustrates an example functional circuit implementation of the DTC 30 included in the apparatus 28 implemented in conjunction with each application instance 14. In the illustrated example, the DTC 30 includes an SLA classifier 40, an SLA limiter 42, a demand store 44, a rate calculator 46, and a demand distributor plus receiver 48, which can be understood as including all or elements of the CC 32, for the exchange of local demand information.

The incoming application traffic to the DCT 30 is an aggregate of all application traffic being sent toward the application instance by the load balancer 20 (not shown) and thus includes a mixture of traffic from any number of flows 22. Likewise, the application traffic flowing out of the DTC 30 and into the application instance 14 represents an aggregated flow. However, the aggregated flow of traffic from the DTC 30 toward the application instance may be policed, shaped, or otherwise regulated, as compared to the incoming aggregation seen by the DTC 30 from the load balancer 20. For example, the aggregated application traffic flowing out of the DTC 30 may be rate-limited or otherwise shaped as compared to the aggregated application traffic flowing into the DTC 30.

Figure 4:
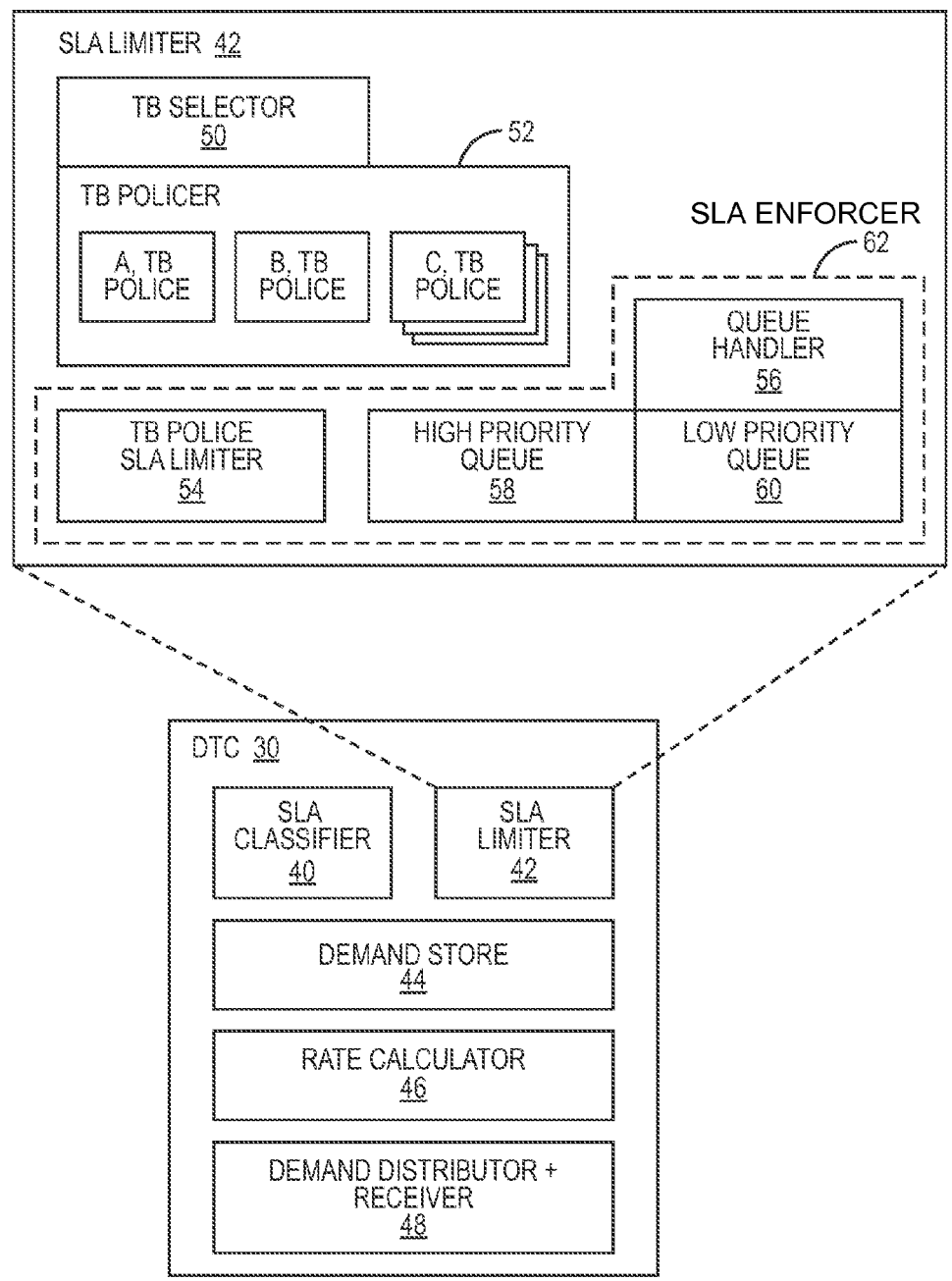
FIG. 4 is a block diagram of further example details for the distributed traffic controller of FIG. 3.

To better understand operation of the SLA limiter 42 in an example configuration, FIG. 4 illustrates a functional circuit configuration of the SLA limiter 42 according to one embodiment. In the depicted embodiment, the SLA limiter 42 includes a token bucket selector 50, abbreviated in the drawing and hereafter referred to as the "TB Selector 50." The SLA limiter 42 further includes a traffic policer 52 that logically includes and operates with token buckets "A", "B", "C" and so on for respective flows 22 denoted as "A", "B", "C" and so on. Still further, the SLA limiter 42 includes a TB police SLA limiter 54, a queue handler 56 and corresponding high and low priority queues 58 and 60, which may actually comprise multiple high and low priority queues and which may be implemented in working memory available to the apparatus 28 within the host operating environment. These entities may be understood in the aggregate as a SLA enforcer 62.

Figure 5:
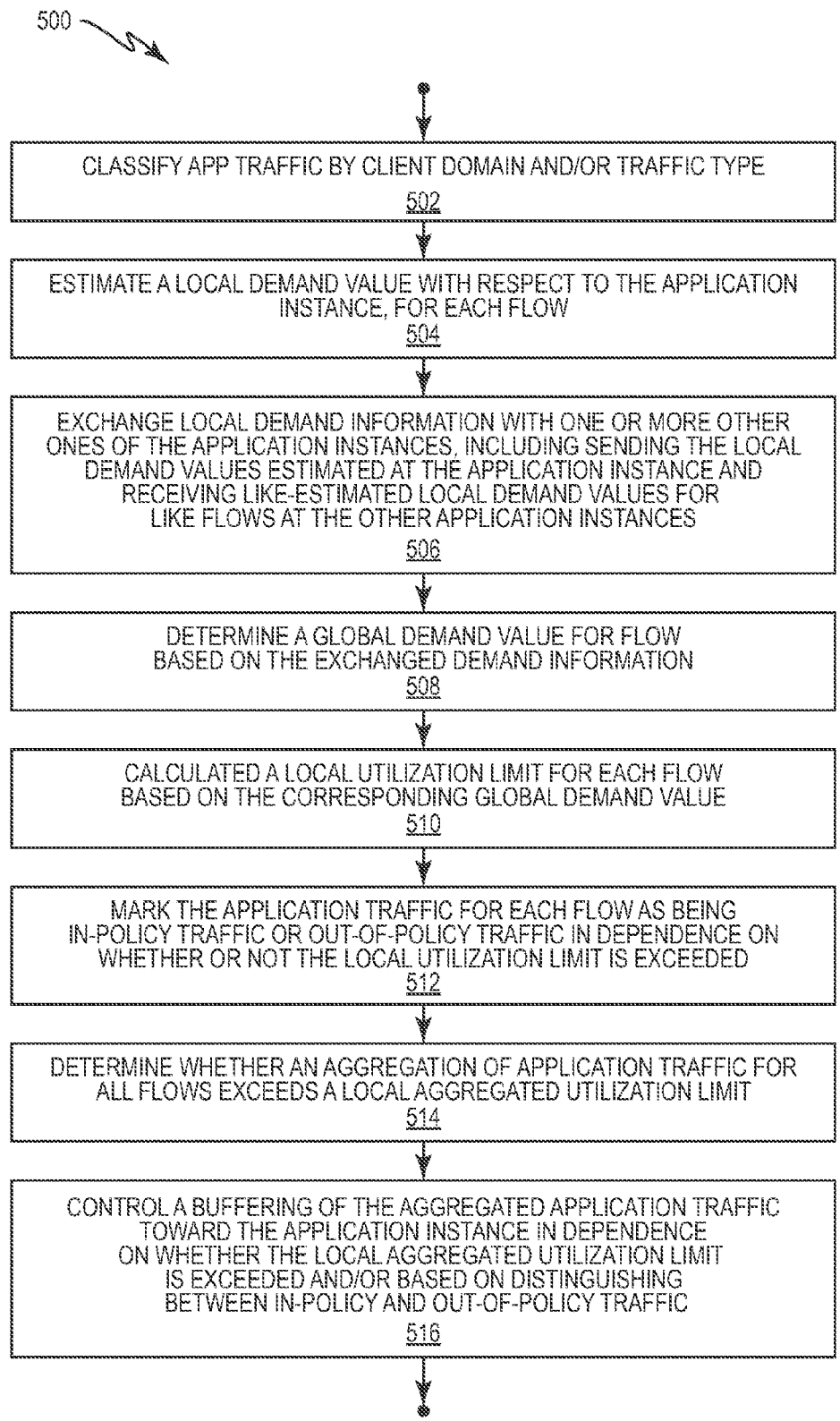
FIG. 5 is a logic flow diagram of one embodiment of a method of distributed traffic control as contemplated herein.

While example details are given for the operation of these detailed functional circuit arrangements, it is helpful to refer to the overall method of operation implemented by each apparatus 28. FIG. 5 provides an example of that method, denoted as "method 500" in the diagram. The method 500 will be understood as a method of controlling a maximum overall utilization of a software application 10 by an individual client 12, wherein the application 10 is implemented across a number of peer application instances 14 that receive application traffic dynamically distributed to them from a plurality of clients 12.

The method 500 at each application instance 14 comprises: classifying application traffic incoming to the application instance 14 into flows 22 (Block 502); estimating (Block 504) a local demand value for each flow 22, with respect to the application instance 14; exchanging (Block 506) local demand information with one or more other ones of the application instances 14, including sending the local demand values estimated at the application instance 14 for each flow 22 at the application instance 14 and receiving like estimated local demand values for like flows 22 at the other application instances; determining (Block 508) a global demand value for flow 22, with respect to the application 10, based on the exchanged local demand information; calculating (Block 510) a local utilization limit for each flow 22 as a function of the global demand value determined for the flow; and marking (Block 512) the application traffic in each flow 22 as being out-of-policy traffic or as being in-policy traffic, in dependence on whether or not the local utilization limit for the flow 22 is exceeded.

The method 500 further includes: determining (Block 514) whether an aggregation of the application traffic of all the flows 22 at the application instance 14 exceeds a local aggregated utilization limit; and controlling the buffering of aggregated application traffic toward the application instance based on whether the local aggregated utilization limit is exceeded and/or based on distinguishing between in-policy and out-of-policy traffic, e.g., in terms of buffering priority.

The method 500 controls the application traffic across any number of servers/application instances 14 in a decentralized manner and yields, among its several advantages, the controlled sharing of application resources by any number of clients 12. Broadly, with the apparatuses 28 and method 500 as contemplated herein, there exists no central point of enforcement or control of resource allocation. Rather, each apparatus 28 serves as a traffic regulator for a respective one of the application instances 14, and runs two main algorithms: a local traffic control algorithm, as provided by the DTC 30, and a state propagation algorithm, as provided by the CC 32.

While the following details may be varied in certain respects, in one or more embodiments, the DTC 30 at each application instance 14 regularly calculates and stores a "demand" based on the application traffic incoming for the application instance 14, in each of one or more classified flows 22. These estimated demand values are regularly and efficiently propagated to the other DTCs 30 using a propagation algorithm—i.e., the local demand information calculated at each DTC 30 is shared with the other DTCs 30. Further, each DTC 30 regularly calculates a resource limit value—e.g., a rate—based on its own demand calculations and those of the other DTCs 30, along with a configured or known value representing an overall application capacity in the same measurement terms. Each DTC 30, independent of its peers, limits the application traffic in each of the flows 22 being handled by its respective application instance 14, based on regulating the application traffic flows 22 at the application instance, to provide a fair or balanced share of the application capacity.

Consequently, the application instances 14 themselves do not need to share state information, and no application instance 14 has a special role as compared to its peer application instances 14. Likewise, no apparatus 28 has a special role as compared to its peer apparatuses 28. Each apparatus 28 simply operates in like fashion, using local demand values propagated among the apparatuses 28 to provide an independent traffic regulation function at each application instance that nonetheless allows the overall application 10 to meet SLA requirements for individual clients 12 without allowing any one of those clients to over-utilize the application 10. Thus, the apparatuses 28 provide enough coordination across the application instances 14 to enforce SLAs at the application level.

As noted, the application traffic incoming for any given application instance 14 may be categorized into different flows based on originating identity associated with the traffic. For example a flow can be requests from a client 12 contained in soap/http or telnet messages, where all such requests have the same user identity. Each flow may thus be associated with a certain SLA, for example a minimum request rate and/or a maximum burst size to be fulfilled by the application 10 at large.

Turning back to FIG. 3 for a further discussion of example operating details, client identity for given application traffic—e.g., a given incoming request message—is read or otherwise determined by the SLA classifier 40 and the traffic is tagged using the appropriate SLA classifier for that client 12. Note that the SLA classifier 40 also may be implemented in the application instance 14, such that incoming application traffic is identified and tagged by the application instance 14, passed to the apparatus 28 for controlled buffering as taught herein, with the resulting regulated application traffic then returned by the DTC 30 to the application instance 14 for processing.

The application client identities (IDs) may be stored in the demand store 44. The SLA limiter 42 operates as a traffic shaper by enforcing the SLA tags set by the SLA classifier 40, where the SLA tags can be understood as a type flow classification or identifier. Traffic shaping in this regard may be implemented using a token-bucket scheme. See, e.g., Kim, Han Seok; Park, Eun-Chan; Heo, Seo Weon, "A Token-Bucket Based Rate Control Algorithm with Maximum and Minimum Rate Constraints," *IEICE Transactions on Communications*, Volume E91.B, Issue 5, pp. 1623-1626 (2010), which is incorporated by reference herein.

On given intervals "A", the rate calculator 46 reads the information in the demand store 44 and updates all token bucket rates in the SLA limiter 42—see, e.g., the token buckets for clients A, B and C, as shown in the traffic policer 52 depicted in FIG. 4, in association with the TB selector 50. On given intervals "B", the demand distributor and receiver 48 reads the demand store 44 and synchronizes local demand information at the other application instances 14 using a gossip-based anti-entropy protocol algorithm. The intervals A and B need not be equal, e.g., the interval B may be longer than the interval A, and the absolute values of both such intervals may be set as needed or desired within the context of a specific application. Shorter intervals provide better "system" response but increase signaling overhead between the peer apparatuses 28. Significant flexibility exists, however, as the rate calculator 46 and DTC 30 in general operate as a separate process inside the apparatus 28, as compared to the CC 32.

Turning to the example SLA limiter implementation shown in FIG. 4, one sees that the SLA limiter 42 performs traffic shaping based on the operation of a number of functional circuits. Operationally, the SLA limiter 42 enforces a calculated local utilization limit—e.g., a local rate limit—on every application message that arrives for processing by the application instance 14. On every application message incoming to the application instance 14, the SLA limiter 42 executes the following logical processing operations: (1) the SLA tag from the application message is read by the TB selector 50 and a dedicated Token Bucket police instance is picked from the set of existing TB police instances in the traffic policer 52, based on the SLA tag. In other words, the flow 22 to which the application message belongs is identified, and the proper token bucket is identified, e.g., for flow A, B, C, etc.

The application message is evaluated by the appropriate one of the TB police instances in the traffic policer 52. The application message is marked as being in-policy or out-of-policy in dependence on whether the application traffic for the flow 22 does or does not exceed the local utilization limit calculated for that flow 22. Correspondingly, the queue handler 56 uses the policing outcome from the traffic policer 52 to choose the correct queue (low-priority or high-priority). As noted, the queues 58 and 60 included in the SLA enforcer 62 also may be organized according to further prioritizations, such as SLA-based minimum service rates that result in certain buffered application traffic being buffered at higher priorities than others.

The traffic policer 52 can be understood as imposing a first level or step of traffic policing, which is performed on a per-flow basis. Correspondingly, the SLA enforcer 62 can be understood as imposing a second level or layer of traffic policing, with the key distinction being that the policing enforced by the SLA enforcer 62 operates on the aggregation of all traffic flows 22 at the apparatus 28/application instance 14. In an example configuration, the SLA enforcer 62 controls the buffering of aggregated application traffic toward the application instance 14 based on whether the local aggregated utilization limit is or is not exceeded and/or based on distinguishing between in-policy and out-of-policy traffic. For example controlling the buffering can imply that a message is not buffered as long as the local aggregated utilization limit is not exceeded, or that messages can end up in different buffers, where each buffer is drained with different priorities.

Further, the local aggregated utilization limit may be expressed, for example, in terms of one or more flow parameters, such as a maximum aggregated flow rate and/or a maximum aggregated burst size.

In one approach, the queue handler 56 checks whether the buffers 58, 60 contain any application traffic. If all such queues are empty, the SLA enforcer 62 does not impose traffic regulation and given application messages are passed along to the application instance 14 without prioritized buffering delays.

On the other hand, if the buffers 58, 60 are not empty the queue handler 56 drains the buffers 58, 60 according to a defined priority scheme, e.g., application traffic buffered in a high-priority buffer is drained at a rate 0.99*R_tot, while application traffic in a low-priority buffer is drained at a rate of 0.01*R_tot, where R_tot denotes a maximum aggregated flow rate.

Thus, in at least some embodiments described herein, different flows 22 can be mapped to different buffers. The high and low priorities represented by the buffers 58 and 60 are an example of such. All application traffic can be placed into such buffers and then drained according to local utilization limits, and/or according to local aggregated utilization limits.

Figure 6A:
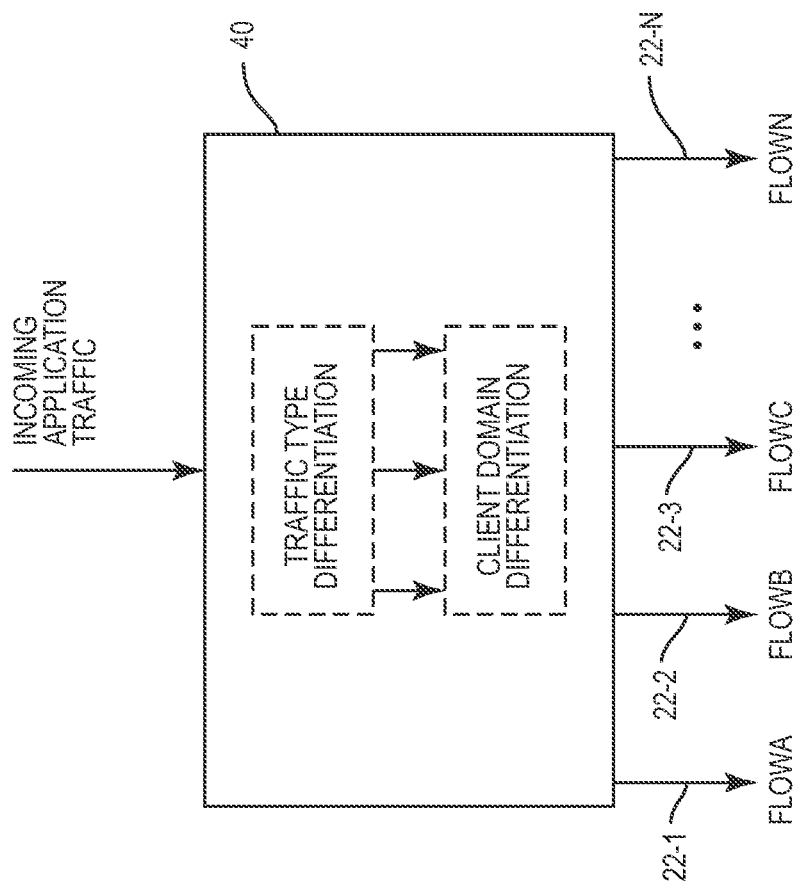
FIGS. 6A and 6B are block diagrams providing further example details for the traffic classifier and per-flow policing arrangements that may be implemented in a distributed traffic controller.

FIG. 6A illustrates example operation of the SLA classifier 40, which "filters" or otherwise logically processes all application traffic incoming for the application instance, e.g., from a load balancer 20 or other source. As a result of its processing, the incoming application traffic is classified—e.g., via SLA tagging as described above—into flows 22, with each flow 22 comprising all of the application traffic associated with the same client context. In the example, one sees the SLA classifier 40 categorizing the incoming application traffic into multiple flows 22, e.g., FLOWA, FLOWB, FLOWC, and so on to FLOWN.

Figure 6B:
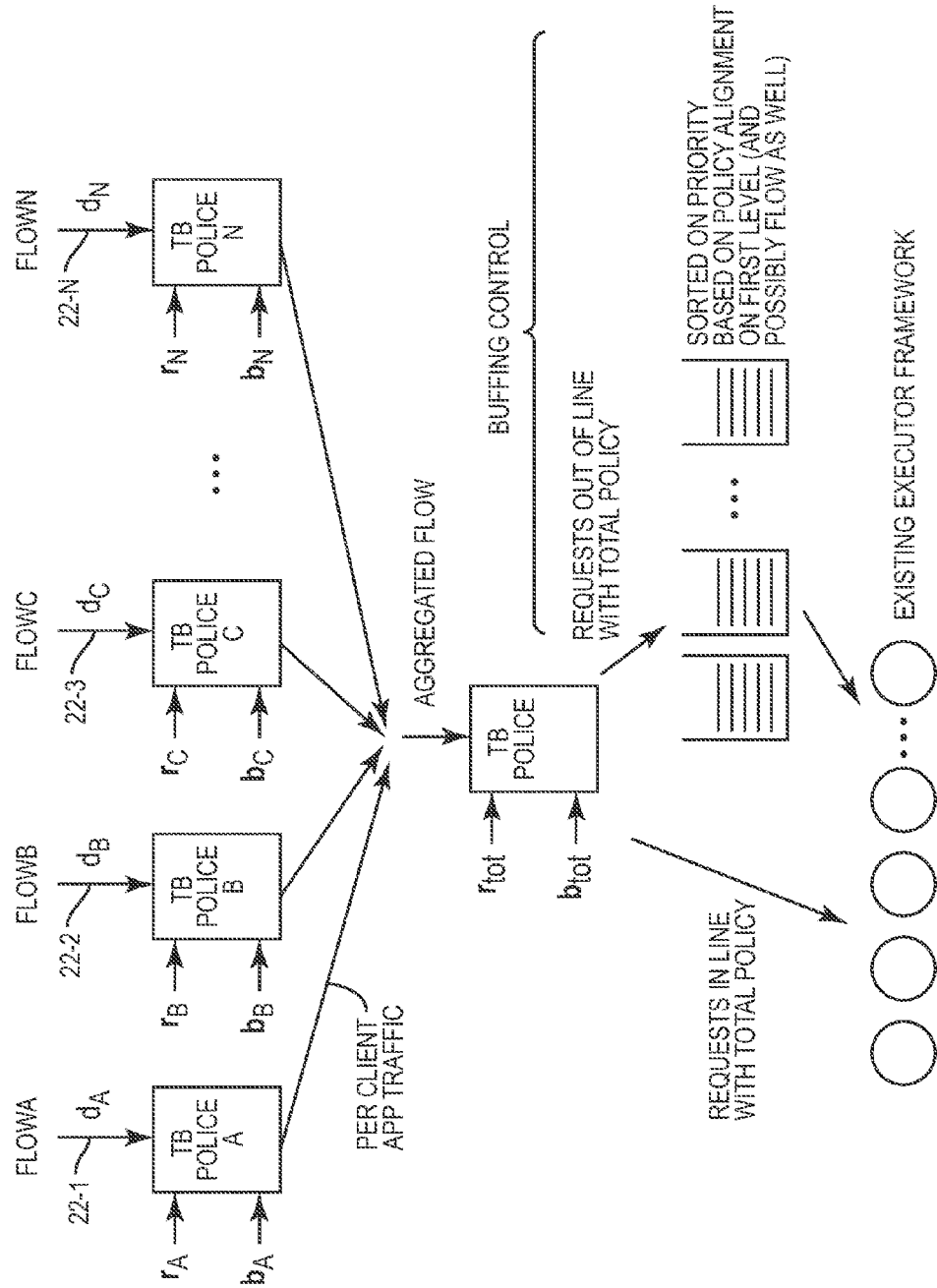

FIG. 6B extends this same flow processing example by illustrating operation of the SLA limiter 42 on the individual flows 22, according to one embodiment. Before delving into the details however, it will be helpful to introduce a notation for such processing:

"flow_x" denotes all application traffic for the same client context across all application instances 14;

"flow_x,i" denotes all application traffic for the same client context at any given application instance 14, i.e., the "i" indicates a specific one of the application instances 14 and therefore it will be understood that the DTC 30 at application instance 14-i estimates a local demand value for flow_x,i, and estimates an associated global demand value for flow_x based on receiving local demand values flow_x,y, flow_x,z, and so on, where "y" and "z" denote other instances of the flow_x at respective other application instances 14-y and 14-z;

"d_x,i" denotes the local demand value estimated for flow_x,i;

"r_x,i" denotes the local flow utilization limits for flow_x,i in terms of flow rate, and other limits may additionally or alternatively apply, such as a maximum burst size, denoted as "b_x,i";

"r_tot,i" and "b_tot,i" denote local aggregated utilization limits applicable to the aggregation of all flows 22 at a given application instance 14-i, as expressed in flow rate and burst size limits—e.g., r_tot,i=r_x,i+r_y,i+r_z,i, where r_y,i and r_z,i represent maximum flow rate limits for flow_y and flow_z at the application instance 14-i;

With the above notation, "R_x" may be used to denote a maximum overall utilization for all instances flow_x,i of flow_x. Similarly, "B_x" may be used to denote a maximum overall burst size limit for all instances flow_x,i of flow_x.

Still further, "R_tot" may be used to denote a maximum aggregated flow rate for the aggregation of all flow instances across all application instances 14. Likewise, "B_tot" may be used to denote a maximum burst size limit for the aggregation of all flow instances across all application instances.

With the above notation in mind, the apparatus 28 at every application instance i performs the following operations, e.g., at regular intervals: estimation of d_x,i for every flow_x, such as by counting the number of protocol sessions in use by flow_x, or by estimating an expected flow rate for flow_x for the near future, e.g., by assuming that the future flow rate is equal to the current arrival rate, or by setting d_x,i to "1" if any application messages have been seen in flow_x recently and otherwise setting d_x,i to "0", where this binary approach may be particularly advantageous for a perfectly even distribution of traffic from the load balancer 20.

Further, at regular intervals—although not necessarily the same intervals as used for demand estimation—each apparatus 28 at each application instance i performs the following operations:

"publication" of all the d_x,i values for all flows 22 at the application instance i, where publication may be accomplished using a gossip-based anti-entropy protocol;

calculation of the global demand values for all flows 22 at the application instance i based on the known demand estimates from the other application instances, e.g., the global demand for a given flow_x is D_x=sum of all d_x,i, over all application instances i=1 to N; and adjustment of r_x,i for each flow_x,i at the application instance i in order to do a local allocation proportional to the state (demand) at the other instances, e.g., the local utilization limit for each flow_x,i expressed in terms of flow rate is calculated as r_x,i=R_x*(d_x,i/D_x).

Note that the above adjustment step represents a simple, example local utilization limit determination. The local utilization limit for each flow 22 at a given application instance 14 may include enforcing a minimum and maximum flow rate. Further, note that b_x,i and B_x also can be updated in similar fashion, e.g., using similar linear expressions. Still further, in some embodiments, e.g., for traffic shaping in the case maximum transaction per second limitations, r_tot and b_tot may also be adjusted, e.g., r_tot,i=R_tot*sum over all x of d_x,i as divided by the sum over all x of the sum over all N of d_x,i.

The above operations enforce the R_tot limit on the distributed system 16—i.e., in an overall sense with respect to the application 10. Similar enforcement may be accomplished with respect to maximum aggregated burst sizes, etc.

Thus, still in the context of FIG. 6B, it will be understood that the SLA limiter 42 performs a number of operations steps, including a first operational step(s) of classifying—a form of "policing"—the application traffic according to a defined priority with respect to the corresponding local utilization rate. Every classified application message from all application traffic flows 22 is aggregated in one of the given priority queues implemented in the buffers 58, 60. The priority queues are the single checkpoint of the aggregated application traffic regulation implemented by the apparatus 28. The priority queue traffic parameters—e.g., max flow rate and max burst size—enforce the achievable traffic comprising all incoming flows 22, exemplified here as flows 22-1, 22-2, and so on, with each flow 22 corresponding to a different client context. Here, "achievable traffic" could be a maximum possible utilization possible, which could be given by the maximum possible "load", or as defined administratively by dimensioning and/or a business decision, such as a license quota. Such rates sum, for example, up to R_tot.

The traffic parameter values of FLOWA are rapidly synchronized with parameter values from other application instances 14 having the like FLOWA—i.e., having the same application traffic type and client domain. Using the previously introduced notation, like flows 22 can be denoted as different instances of a given flow_x, e.g., flow_x,i at application instance 14-i, flow_x,j at application instance 14-j, and flow_x,k at application instance 14-k. Here, the "x" denotes a common client context and the "i", "j" and "k" denote different ones of the application instances 14 receiving application traffic belonging to that client context.

Figure 7:
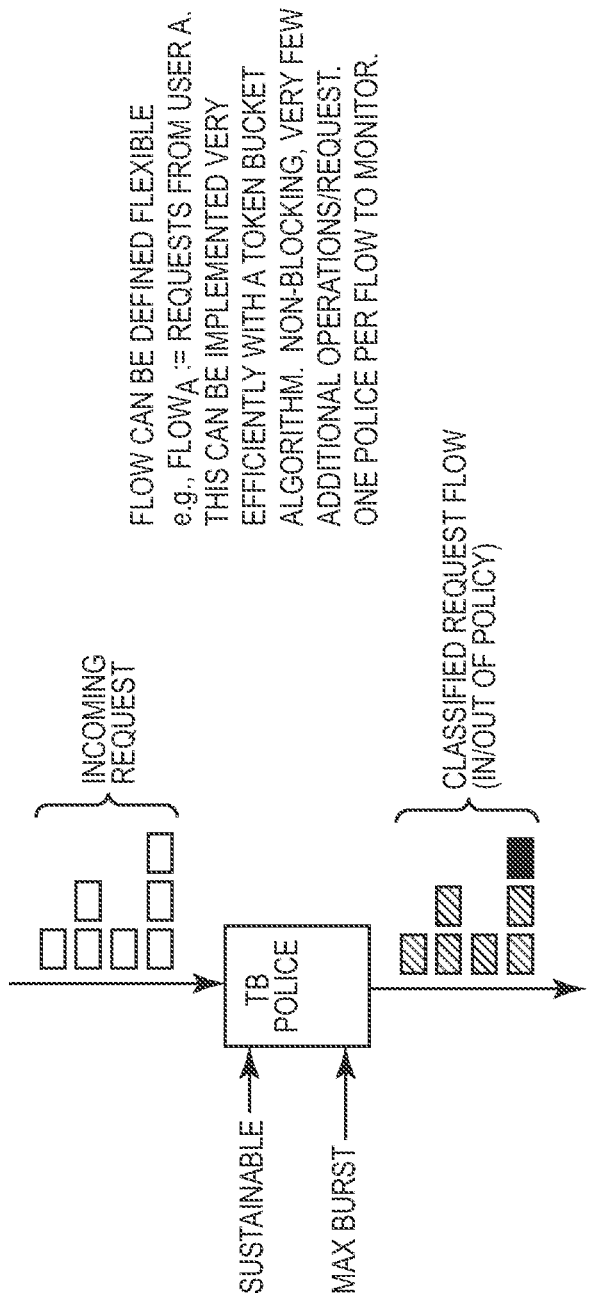
FIG. 7 is a block diagram that graphically depicts one embodiment of per-flow policing, based on marking application traffic as in-policy or out-of-policy.

FIG. 7 graphically describes the processing implemented "inside" an instance of the traffic policer 52 and/or TB police SLA limiter 54. The policing algorithms used by both such processing units are identical in one or more embodiments.

Figure 8A:
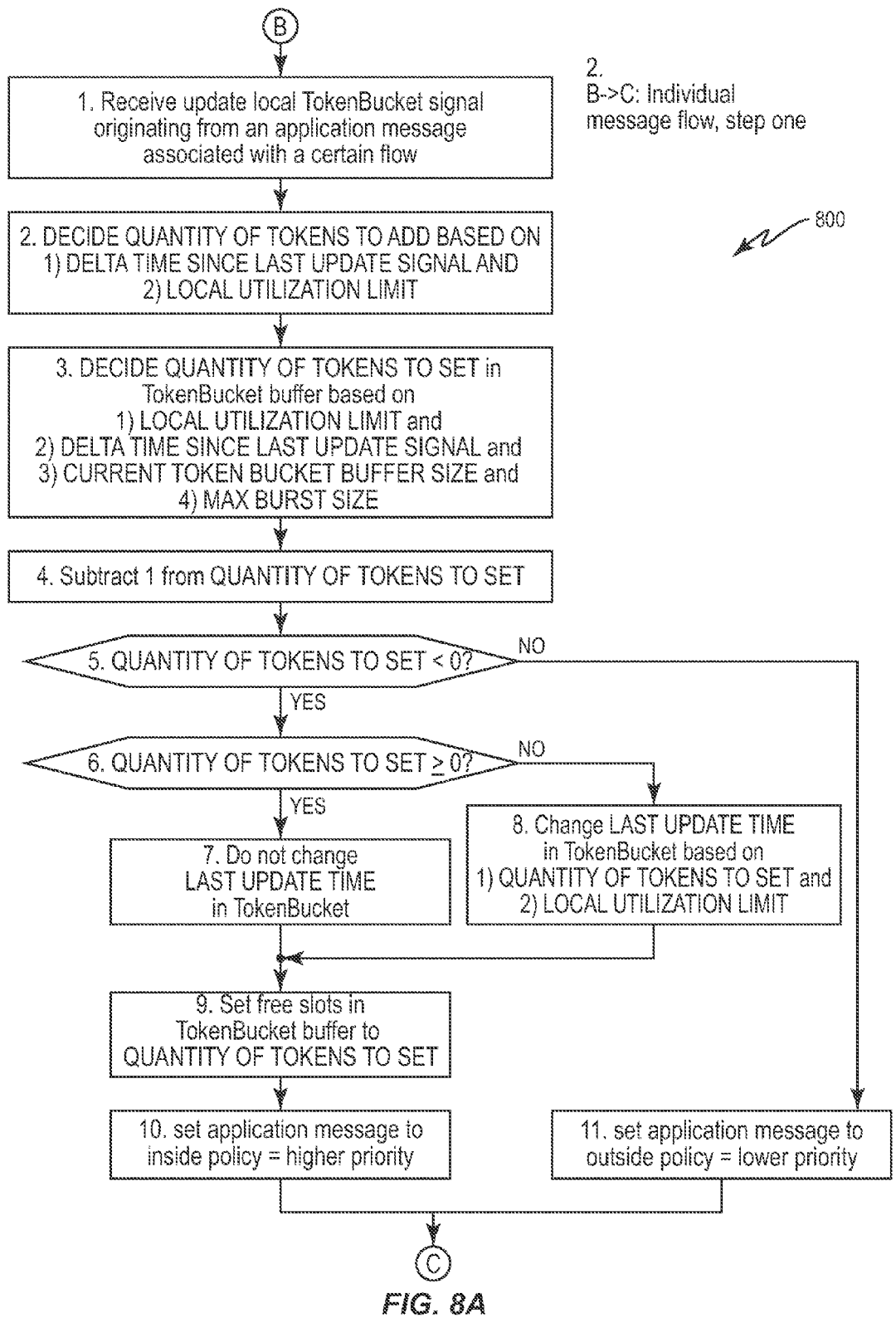
FIGS. 8A, 8B and 9-11 are logic flow diagrams of token-bucket based traffic policing as performed by a distributed traffic controller according to one or more embodiments taught herein.
Figure 8B:
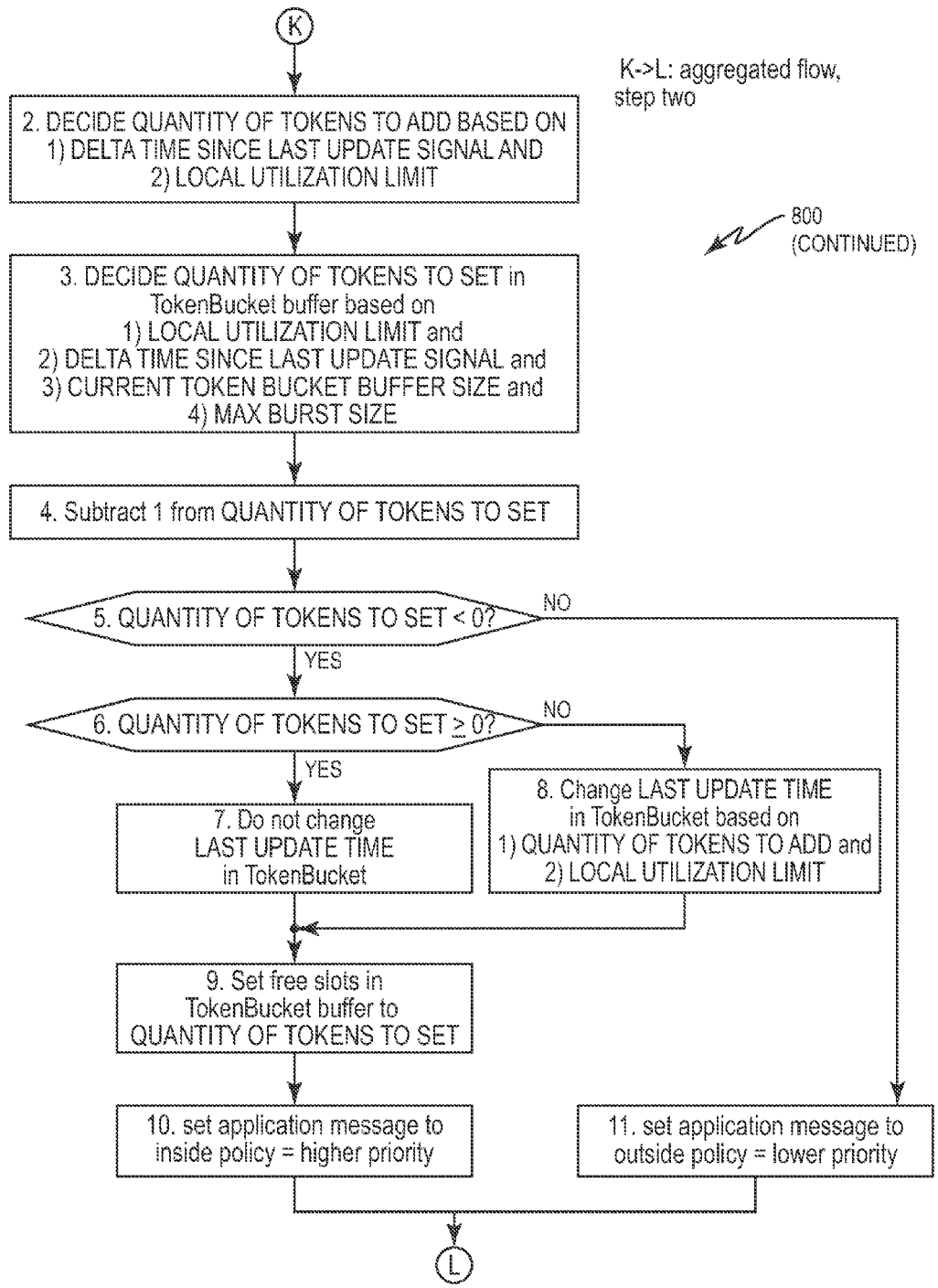

FIGS. 8A and 8B describe example details of the token bucket algorithm that is executed inside the sub functional blocks within the traffic policer 52 and the TB police SLA limiter 54. The algorithm is denoted as "method 800" in the illustration. Again, the algorithms running in these sub functional blocks may be identical, with the difference being that the entity 52 operates on a per client flow basis user per client flow utilization limits, while the entity 54 operates on the aggregated traffic flow using aggregated utilization limits. Therefore, one sees two entry points for the token bucket processing method 800, entry point "B" (in FIG. 8A for entity 52) and entry point "K" (in FIG. 8B for entity 54), and, correspondingly, two exit points "C" (for entity 52) and "L" (for entity 54).

Processing in the method 800 "begins" with receiving a signal indicating that it is time to perform token bucket updating (Step 1). The number of tokens to add into the token bucket for a given flow 22 is determined and this represents enforcement of the local utilization limit for the flow 22 (Step 2). The determination is decided based on a number of factors, including, e.g., the delta time since the last update, the traffic service or flow classes, etc. Step 3 includes determining the number of tokens to set in the involved token bucket based on, e.g., the time since the last update, traffic service classes, the current token bucket buffer size, max burst rates, etc. With these determinations made, Steps 4-11 outline an example approach to determining whether an application message is in-policy or out-of-policy.

Figure 9:
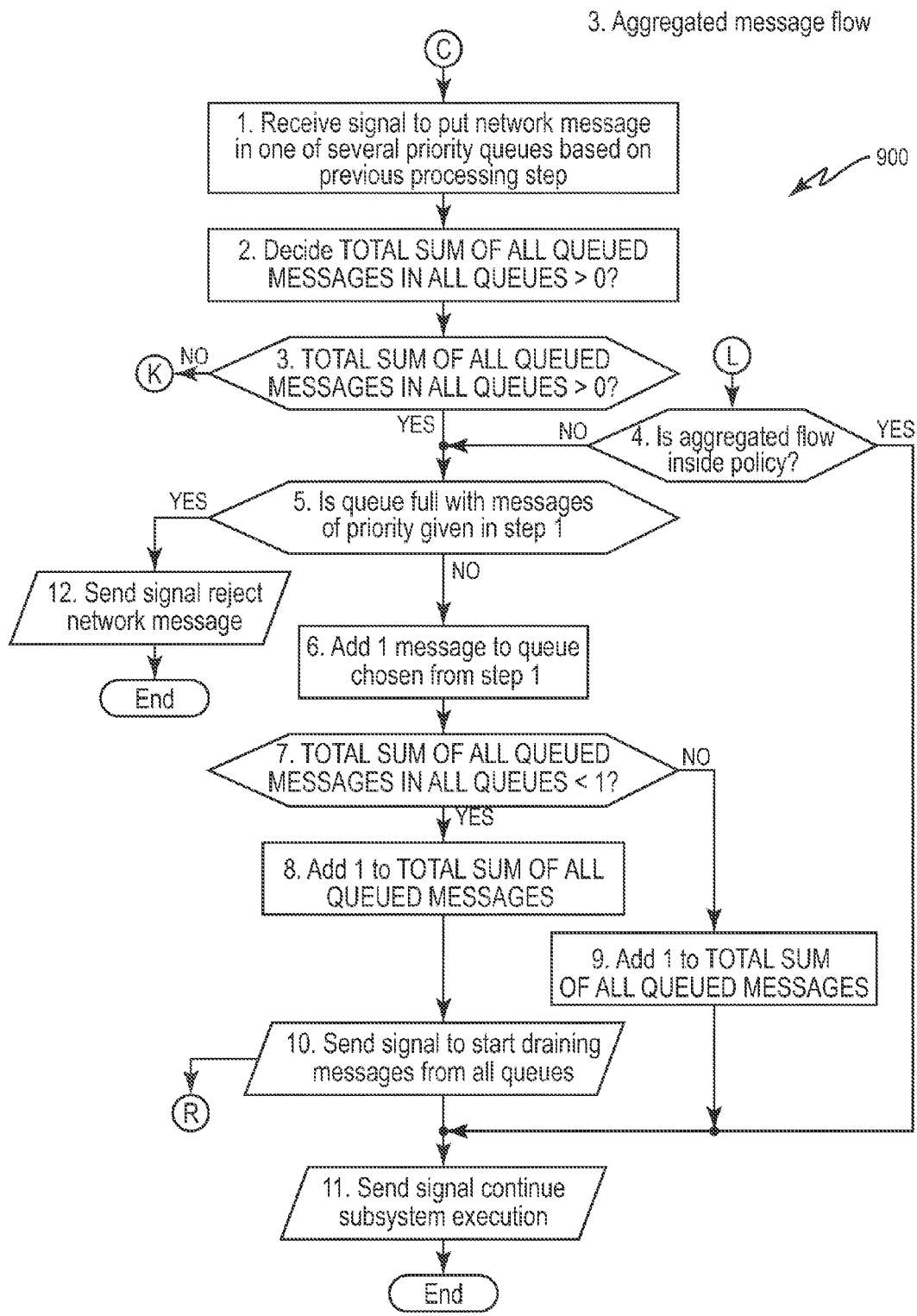

FIG. 9 outlines the algorithms running inside the queue handler 56 in one or more embodiments, which are generally denoted as "method 900". The illustrated method 900 includes processing steps 1-11 and operates on the aggregated message flow within each given apparatus 28 and is executed for every item of application traffic incoming to the apparatus 28—e.g., on each new incoming application message.

Figure 11:
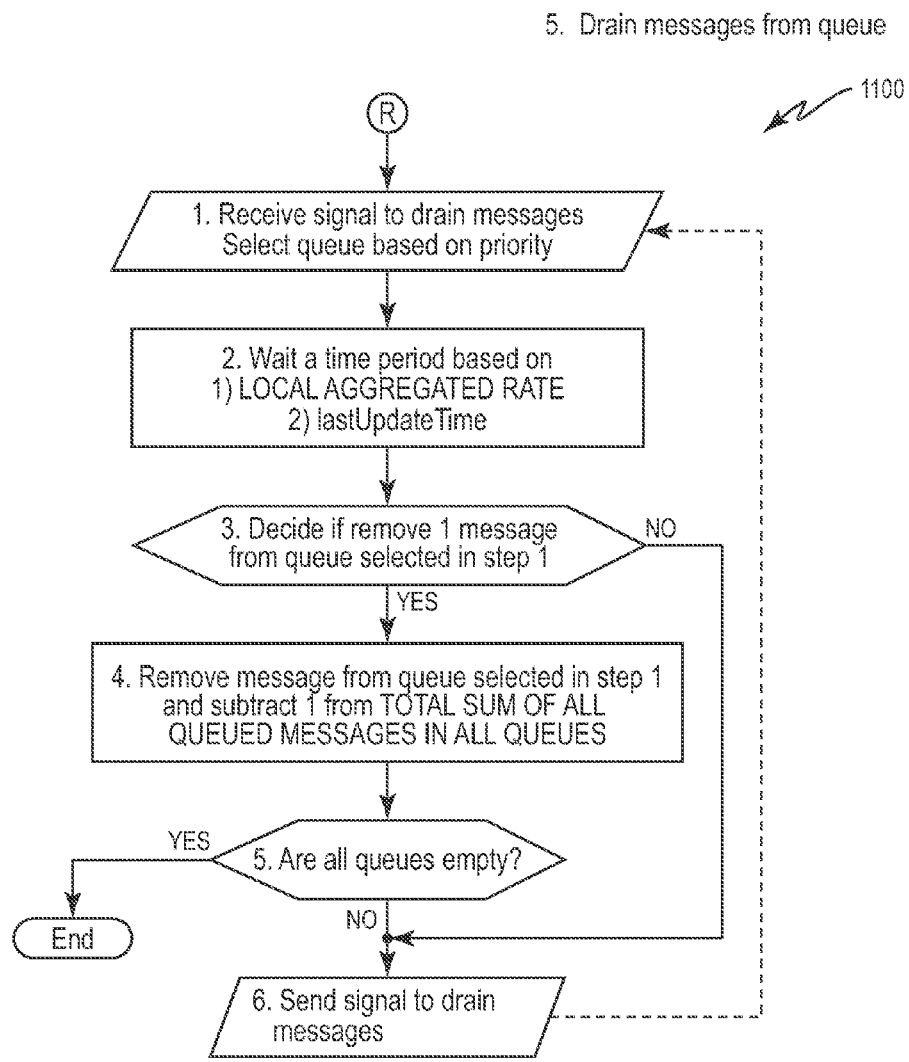

Note that item "R" in the flow diagram corresponds to the method 1100 shown in FIG. 11, which is executed as a separate process and is used to remove items of application traffic—e.g., individual requests or other application messages comprising the application traffic incoming to the apparatus 28/application instance 14—as soon as there is more than one message in any of the queues of the queue handler 56.

In a more detailed example explanation of the processing illustrated in FIG. 9, each incoming message has an associated priority that is used in the algorithm to determine the characteristics of the service of the message (delay, drop, reorder). The algorithm operates in two modes. When a new message arrives the following happens:

If there already are queued messages the message is immediately queued. The queue is selected based on the priority of the message.

If all queues are empty, the recently seen traffic (=arrival process of messages) is inspected to determine if the current message falls within the local aggregated utilization limit of the flow 22 to which the current message belongs. This inspection is based on the token bucket algorithm detailed herein. This action enforces a sustainable rate and a maximum burst size of messages arriving immediately after each other. If the message is within the local aggregated utilization limit, it is directly released for processing by the application instance 14. If the message would violate the limit, it is put in the queue matching its priority.

When the first message is queued, the time period until it can be released is calculated. This time period is derived from the rate limit (r_tot,i from the local aggregated utilization limit) and the elapsed time since the last message was allowed to pass. (Accounting for the elapsed time prevents a too low rate from being imposed.) The algorithm will then schedule a sleep until this time period has passed.

When the time period has passed a request is released from one of the queues. What queue to release from is determined by the priority of the queues, higher priority queues are selected with a higher probability than lower priority queues. If a selected queue is empty a lower priority queue is selected (repeated until a message is found, "wrapping around" to a higher priority if needed).

If there still are messages in any queue a new sleep is scheduled, otherwise no action is taken.

Figure 10:
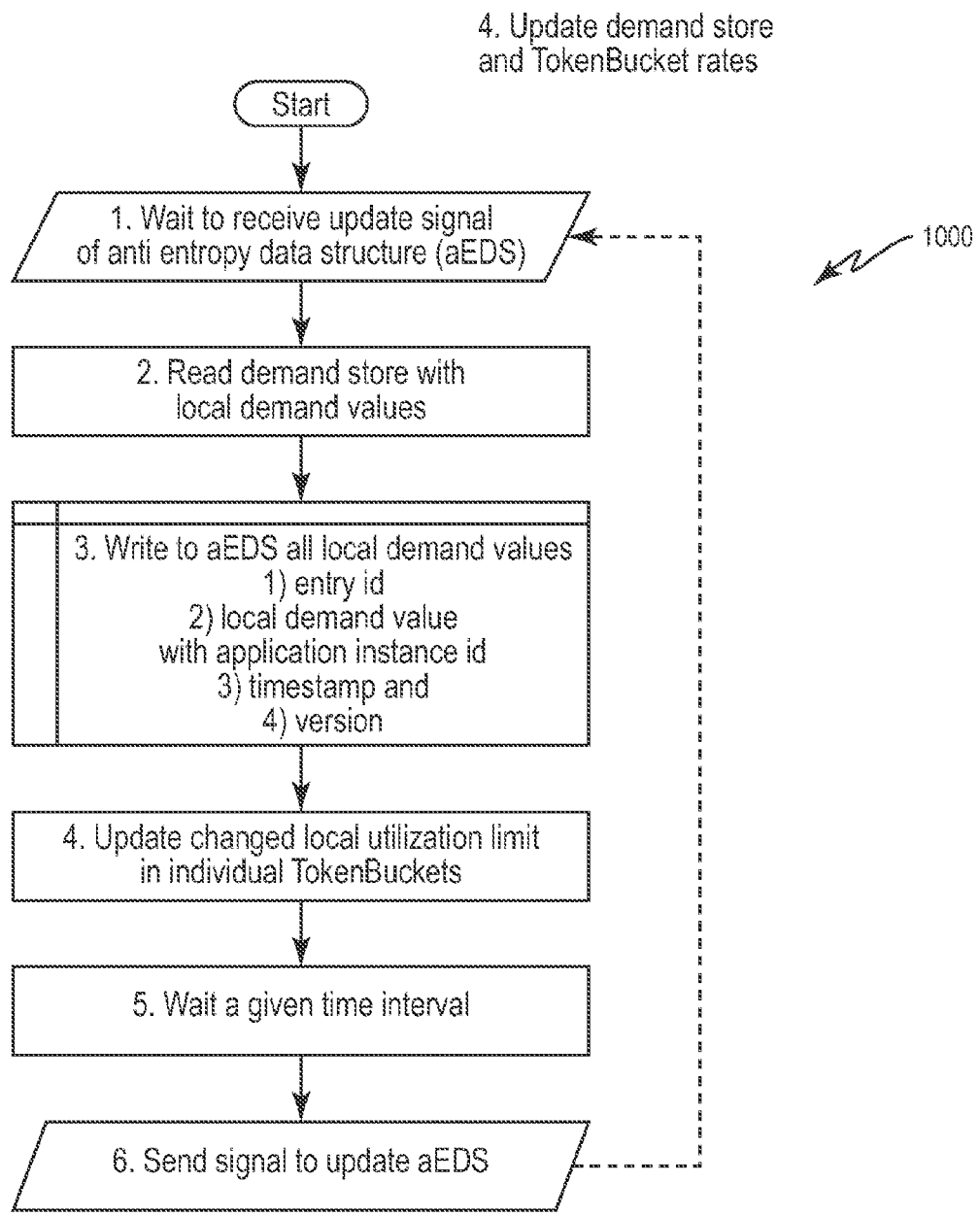

FIG. 10 illustrates a method 1000 of updating a session table and token bucket policy parameters, such as implemented within the rate calculator 46. One sees processing Steps 1-6, wherein an Anti-Entropy Data Structure (aEDS) at a given apparatus 28 is updated based on the exchange of local demand values between the apparatus 28 and one or more of its peer apparatuses 28 (Step 1) and the updated information is written to a corresponding session table with identifying application/server, timestamp and version information (Steps 2 and 3). Processing continues with updating the local utilization limits for the connected clients 12, as enforced via the token-bucket processing implemented in the traffic policer 52 (Step 4), waiting for expiration of the defined aEDS update interval (Step 5), and signaling/triggering a new update (Step 6).

Such processing includes, e.g., the regular or period exchanging of local demand information between the apparatuses 28. Further, it should be understood that the aEDS comprises, in one or more embodiments, a data structure containing all of the relevant demand estimates for the flows 22 at the application instance 14.

One approach to estimating the demand for a given flow 22 at any given one of the apparatuses 28 is to estimate the demand based on the number of client sessions currently open at the application instance 14 for the flow 22. Given that each additional session gives the possibility to issue more requests targeted to this particular application instance 14, a count of the open sessions for each flow 22 works as a rough estimate of the demand imposed by the flow 22 on the application instance 14.

Of course, other metrics may be used to represent demand. For example, the number of sessions, connections, or transaction count or rate supported/allocated by an application instance 14 may be used and/or the observed arrival rate of application messages or the current load of the server on which the application instance 14 is hosted may be used. The DTC 30 in the apparatus 28 operating at each application instance 14 regularly calculates a proper/fair share of the configured application capacity to allocate on a per-flow basis at the traffic policer 52, based on setting the local traffic control parameters, e.g., the local utilization limits. The configured application capacity may be understood as a configured system-wide rate that is locally split up between the application instances 14 and enforced locally at each application instance 14 by the accompanying apparatus 28.

As noted, the capacity calculation (r_x,i and r_tot,i) for each flow 22 of application traffic may be based on: the known demands for like flows 22 at other application instances 14, and the configured SLA for the client 12. In one approach, the local utilization limit used to police the application traffic for a given flow 22 within any given one of the application instances 14 is to calculate the capacity allocation as proportional to ratio of the local demand with respect to the total demand, e.g., local utilization limit for the flow=application capacity allocated for such flows*(local demand of the flow/global demand of the flow). In terms of the earlier notation, the local utilization limit for a flow x at an application instance i is given as $$r\_x,i = R\_x * (d\_x,i / D\_x).$$

The capacity allocated may be known, e.g., from the client identity/identities associated with the flow 22. Further, as explained, the global demand of the flow 22 can be calculated as the sum of the local demand value estimated at the involved application instance 14 and the local demand values estimated for all like flows 22 at the other application instances. Of course, other algorithms may be used for calculating the local utilization limit for each flow. Overall improvements in fairness may be obtained by minimum and maximum capacity allocations for each flow 22 at the application instance 14.

Figure 12:
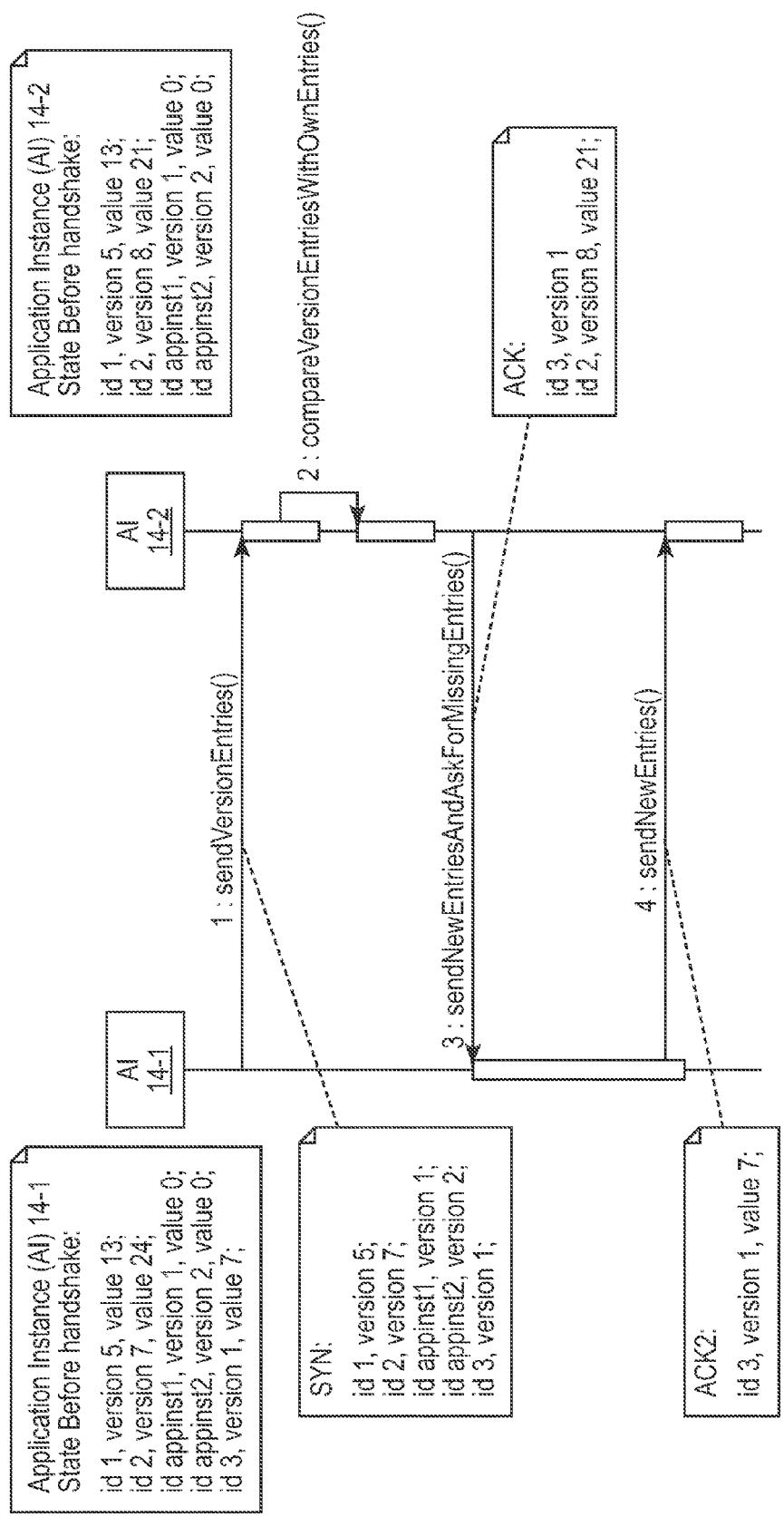
FIG. 12 is a signal flow diagram of one embodiment of exchanging local demand information between distributed traffic controllers.

Regarding details on the exchange of local demand values between apparatuses 28 at different application instances 14, FIG. 12 illustrates an example three-way reconciliation handshake between two peer apparatuses 28. Assuming that the messages are exchanged between the apparatus 28 at the application instance 14-1 and the apparatus 28 at the application instance 14-2, the three messages are SYN, ACK and ACK2. The SYN message includes all entries with ID and version information without demand data from the demand table(s) for the application instance 14-1. The ACK message contains corresponding new content entries based on the demand table information at the application instance 14-2, along with missing version entries.

That is, the apparatus 28 at the application instance 14-2 compares its demand data with that received from the apparatus 28 at the application instance 14-1 and provides updates in the ACK message, along with a request for any missing entries—i.e., demand data for any flows 22 not accounted for in the information maintained in the apparatus 28 at the application instance 14-1. Likewise, the ACK2 message returned toward the application instance 14-2 includes information available at the application instance 14-2 but missing at the application instance 14-1. In this manner, all information for all flows 22 at all application instances 14 is propagated among all of the apparatuses 28 at the respective application instances 14, without it necessarily requiring a direct exchange of local demand information between all possible pairings of the apparatuses 28.

Thus, FIG. 12 can be understood as a non-limiting example of the gossip-based anti-entropy protocol employed by the CCs 32 in the apparatuses 28 for sharing local demand values. Preferably, any anti-entropy algorithm selected for use in exchanging such information will use a three-way reconciliation handshake. The reconciliation is always performed between two peers that know each other. Not all peers need to know each other but there must be at least one application instance 14 that is initially known by all, referred to as a "seed."

More particularly, there is at least one apparatus 28 that has local demand values for all other apparatuses 28, such that every new application instance/apparatus 28 added in support of the overall application 10 can start reconciliation handshaking with this seed apparatus 28. Such operation is only needed during startup so that the peers can start to communicate with each other. At least two seeds should exist in every anti-entropy cluster to avoid single point of failure. After a couple of message rounds in the cluster all peers are aware of each other.

As soon as a new application instance 14 is put into a cluster, the reconciliation handshake starts with peers that are known. The process of selecting a peer is random, which is an effective way to ensure quick distribution.

Figure 13:
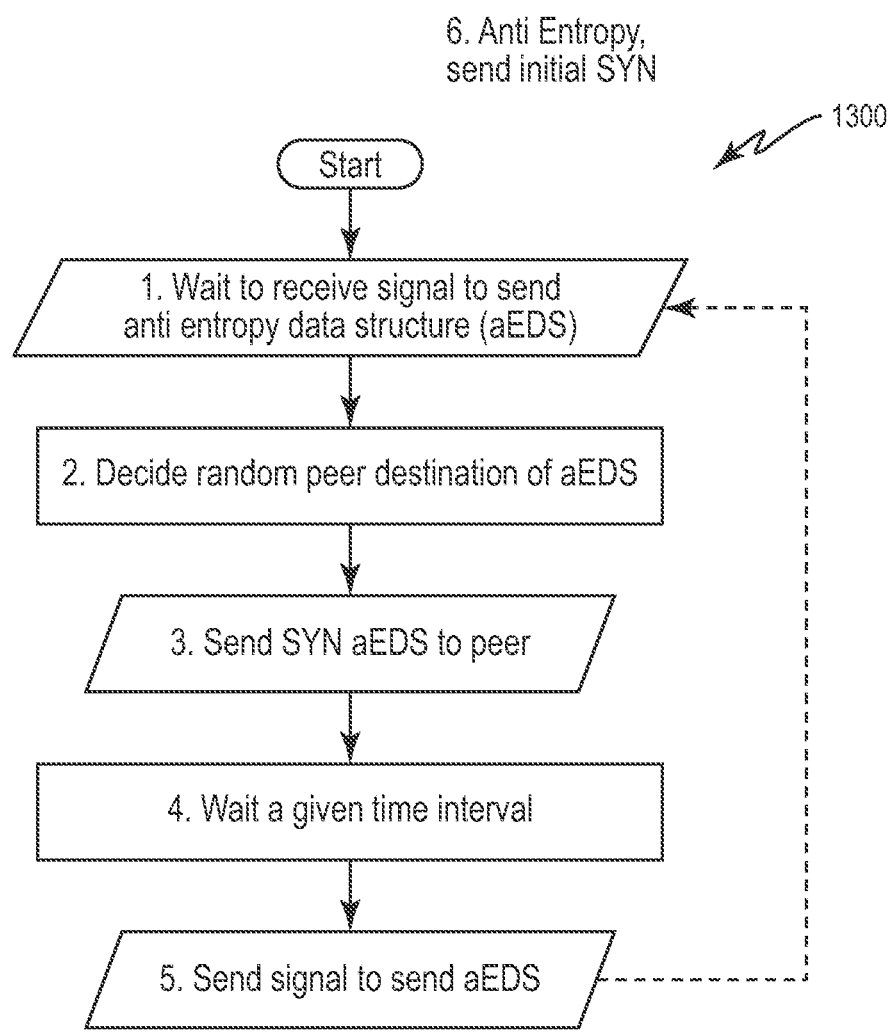
FIG. 13 is a logic flow diagram of one embodiment of generating and sending a synchronization (SYN) message, as part of exchanging local demand information.
Figure 14:
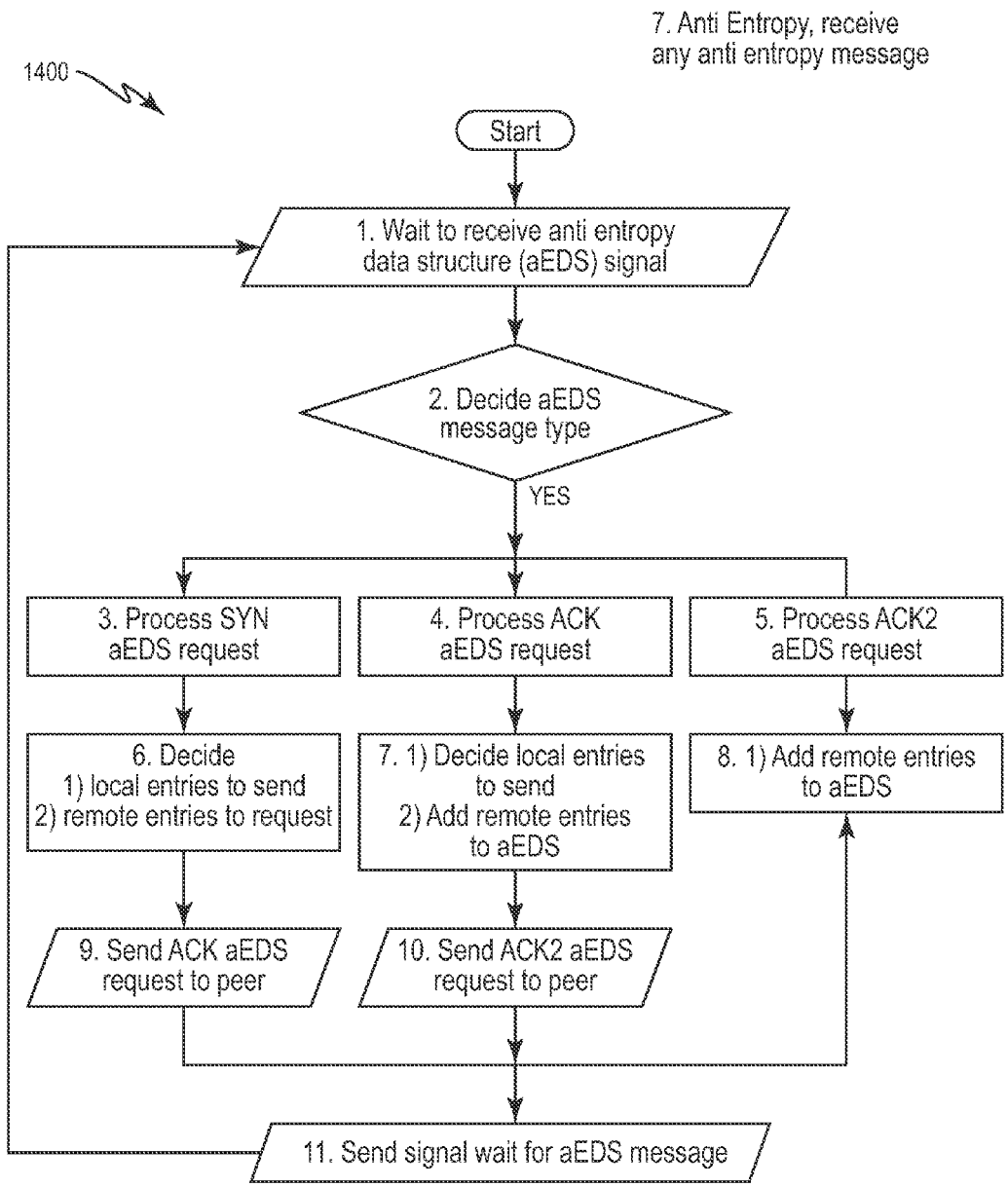
FIG. 14 is a logic flow diagram of one embodiment of receiving and processing certain message types, as received at distributed traffic controller as part of exchanging local demand information.

FIGS. 13 and 14 describe example anti-entropy algorithms in more detail, for the exchange of local demand information among the apparatuses 28. These algorithms run, for example in the CC 32 implemented at each such apparatus 28.

In FIG. 13, one sees processing steps 1-4, which are broadly denoted as "method 1300". The method 1300 includes a first step in which the algorithm waits for signal indicating that it is time to exchange local demand information, e.g., by sending information from the aEDS referred to earlier. Step 2 includes a possibly randomized selection of the peer CC or CCs 32 with which to exchange local demand information, while steps 3 and 4 include sending the SYN signal to the selected peer CC(s) 32 and sending a signal to send the aEDS.

That is, step 3 sends the aEDS to a random peer and step 4 puts the algorithm back into the wait state noted in step 1. Notably, a waiting step—e.g., an interval timer—may be imposed between steps 3 and 4 to control the rate at which SYN requests may be issued.

In FIG. 14, ones sees processing steps 1-11 for handling various types of received handshaking messages. These steps are broadly denoted as "method 1400" and processing begins with waiting to receive an aEDS signal from a peer (Step 1), and continues with deciding which type of aEDS message has been received (Step 2). For example, the message may be a SYN message that includes an aEDS request, i.e., a request for the local demand information at the apparatus 28 that includes the receiving CC 32. For such a message, the method 1400 includes processing the received SYN message, determining which local entries to send, and which remote entries to request, and sending the resulting ACK message (Steps 3, 6, and 9).

For a received ACK message, the method 1400 includes processing the ACK message, determining which local entries to return in the ACK2 message, updating the local demand information with data from the ACK, and then sending the ACK2 message back to the CC 32 from which the ACK message was received (Steps 4, 7, and 10). Similar processing is shown for receipt of an ACK2 message (Steps 5 and 8).

As one of the many example applications of the teachings herein, a horizontally-scaled application 10 may use the disclosed apparatuses 28 or their functional equivalent to set guaranteed service level agreements on users utilizing a telecom provisioning system enabling multiple users sharing the same hardware platform. In the telecom industry many telecom operators have started to split their business into smaller organizational units. These telecom operators want to share the hardware investments between all such sub-operators. The method 500 and apparatuses 28 taught herein for controlling utilization in a horizontally scaled application 10 allows any telecom operator to use this invention to share a given hardware investment among any number of smaller organizational units. Further, the teachings herein make it possible to collect traffic model data, for setting the correct dimensioning for every customer of such systems.

In another example, the method 500 and apparatuses 28 are used in a "transactions-per-second" or "pay-as-you-grow" processing model. In such models, customers pay for a license granting them a defined maximum number of transactions per second (TPS). Thus, a given customer might have any number of clients 12 generating application traffic toward the application 10 and the apparatuses 28 would operate with respect to the application instances 14 comprising the application 10, to limit the maximum TPS provided to the customer by the application 10, and to balance the distribution of transaction processing among the application instances 14.

In another example, the teachings herein provide for user-separated software utilization as a scalable "cloud" service. Such is possible because these teachings make it possible to separate application utilization per user identified by username, application ID, IP-address or any other identity, on any given hardware/software system that is horizontally scalable. By granting user software utilization limits per user, the cloud provider avoids having any single user unfairly monopolize the cloud service. Notably, such benefits flow regardless of whether the host operating systems allow user restrictions to be imposed.

Figure 15:
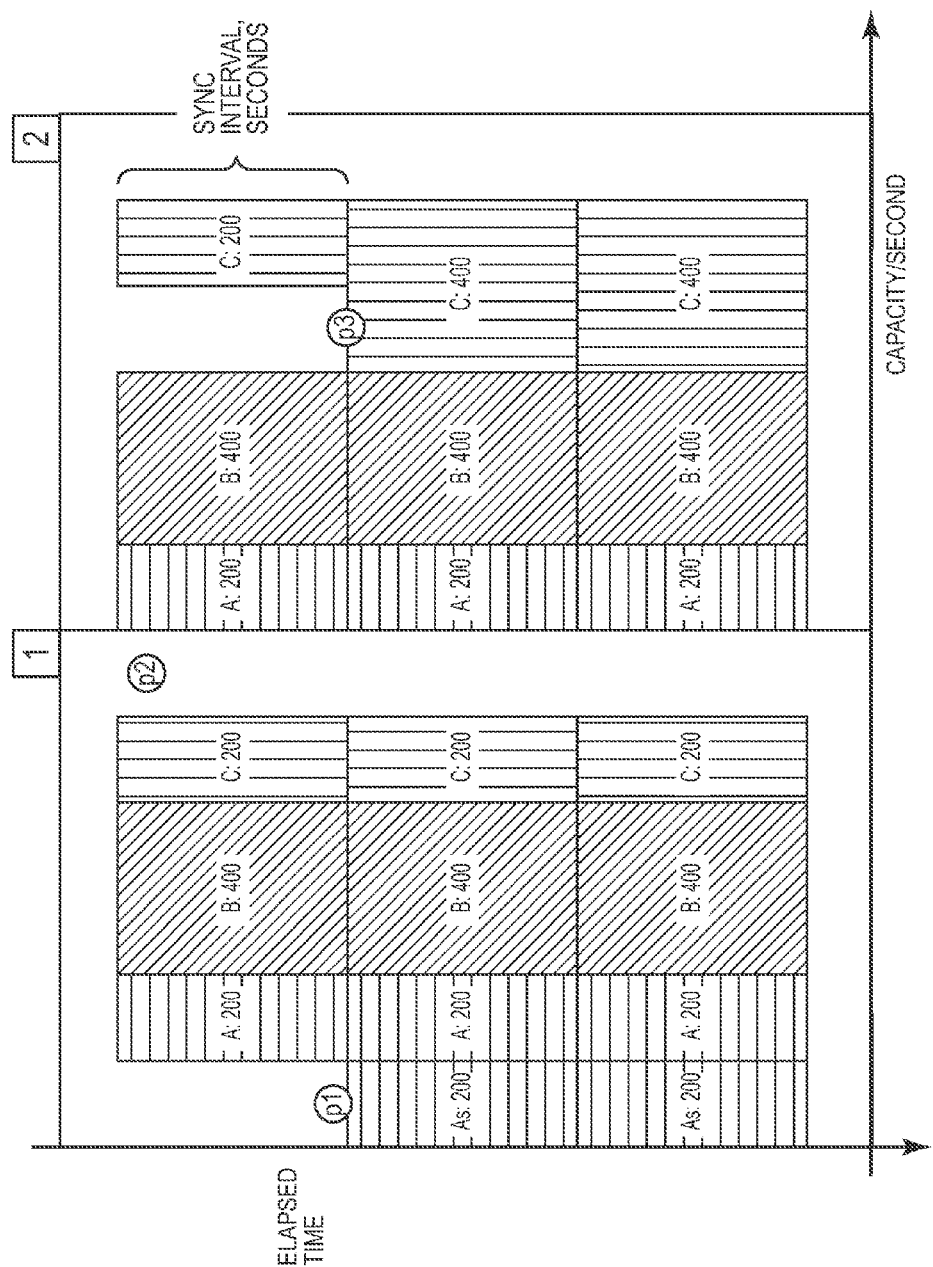
FIG. 15 is a diagram that graphically depicts an example of distributed traffic control as provided for by the distributed traffic control teachings herein.

Providing a further example application of the teachings herein, FIG. 15 provides a simple application of distributed traffic control as taught herein. There are two application instances 14, with four connected clients, A, AS, B, and C, with As denoting a "sticky" client. The aim here is to enforce an application message rate of the whole application, as represented by the two application instances 14 running on two different servers.

The configured total application instance rate is 1000 application messages per second (msg/sec). That value gives 2000 msg/sec for the whole two-node cluster. Spare capacity per virtual server for redundancy scenarios is 200 msg/sec=400 in total. Application clients 12 are given the following rates in the application: application client with user A is given 600 msg/sec, application client with user B is given 800 msg/sec, and application client with user C is given 600 msg/sec. Other properties assumed for the illustrated scenario include the fact that the spare capacity 200 msg/sec is not allocated, i.e., it is used as redundancy in the event of failure.

The application client As—see "p1" in the diagram—starts a synchronization cycle later, and it will be understood that As represents a number of sticky client connections. Application client C increases load—see "p3" in the diagram—from 400 to 600 msg/sec on the second synchronization cycle. Here, each synchronization cycle should be understood as the local recalculation of demand information based on input from local and remote demand information known to the application instance 14.

In another example, a horizontally scaled application 10 is used by a large telecom operator organization. The organization is split into smaller parts, e.g., nineteen different organizational units. The distributed processing system 16 includes ten different servers running an application that is horizontally scaled across them via a load balancing of incoming requests. The total provisioning capacity of the system is 10*400=4000 provisioning requests/second. Every organizational sub-unit gets a configurable share of the 4000 request/second capacity, with that share based on how many subscribers each sub-unit is responsible for. A provisioning request creates, modifies or deletes a mobile subscription in a Home Location Register (HLR) subscriber database.

The ten servers, each of which runs an application instance 14 of the provisioning software application 10, form a "cluster" fed by a load balancer 20. Each application instance 14 in the cluster receives traffic from the load-balancer, which distributes the incoming provisioning traffic requests between the ten servers. Because of the sophisticated utilization limiting provided by the apparatuses 28 paired respective ones of the application instances 14, the load balancer 20 can be quite simple, e.g., a round-robin distribution of traffic requests.

There are two different protocols used in this embodiment: TELNET and HTTP. The session-based/longer-lived TELNET connections make it harder to distribute the overall load evenly over the cluster. HTTP is a stateless protocol with the possibility to distribute on a per request basis using the load-balancer. It is possible to increase the provisioning capacity by 400 requests/second per server by just adding new servers. However, the combination of these protocols makes the traffic load distribution non-uniform. Advantageously, because the sticky connections are accounted for in the local demand value estimations performed by the apparatuses 28, load balancing is achieved even with a very simple traffic distribution scheme into the cluster.

Yet in another example, the application instances 14 comprise twenty heterogeneous load-balancers that distribute load inside a large network of 16000 virtualized servers and non-virtualized servers. In this example, the distributed processing method(s) taught herein split the load-balancer capacity into different flows based on the application IDs of the application messages. The purpose of the load-balancer split in this case is to charge users of the load-balancer in a hosting service provider context, based on available load-balancer capacity instead of charge users for the dedicated hardware cost.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of controlling a utilization of a software application by an individual client, wherein the application is implemented as a number of peer application instances that receive application traffic from any one or more clients in a plurality of clients and wherein the method at each application instance comprises:

classifying the application traffic incoming to the application instance into flows corresponding to different ones of the clients and/or different types of application traffic;

estimating a local demand value for each flow with respect to the application instance;

exchanging local demand information with one or more other ones of the application instances, including sending the local demand values estimated for the flows at the application instance and receiving like estimated local demand values for all like flows at other ones of the application instances;

determining a global demand value for each flow with respect to the application, based on the exchanged local demand information;

calculating a local utilization limit for each flow as a function of the global demand value determined for the flow;

marking the application traffic in each flow as being out-of-policy traffic or as being in-policy traffic, in dependence on whether or not the local utilization limit for the flow is exceeded;

determining whether an aggregation of the application traffic for all flows at the application instance exceeds a local aggregated utilization limit; and controlling a buffering of the aggregated application traffic toward the application instance on a per-flow and/or aggregated flow basis, based on whether the local aggregated utilization limit is exceeded and distinguishing between in-policy and out-of-policy traffic.

2. The method of claim 1, wherein exchanging the local demand information comprises communicating with the one or more other ones of the application instances via a gossip-based anti-entropy protocol that propagates the local demand values as estimated at any one of the application instances to all other ones of the application instances.

3. The method of claim 1, wherein estimating the local demand value for each flow comprises at least one of: counting a number of protocol sessions active at the application instance for the flow; estimating an expected flow rate of the flow based on whether any new application traffic in the flow has been received within a defined interval; and estimating the expected flow rate of the flow based on measuring an arrival rate of the application traffic in the flow.

4. The method of claim 1, wherein determining the global demand value for the flow comprises summing the local demand value estimated for the flow at the application instance with the local demand values estimated for all like flows at the other ones of the application instances, as known from the exchanging of the local demand information.

5. The method of claim 1, wherein calculating the local utilization limit for each flow comprises calculating a local flow rate limit for the flow.

6. The method of claim 5, wherein calculating the local flow rate limit for the flow comprises calculating the local flow rate limit as an overall maximum flow rate limit known for the flow and all of its like flows with respect to the application, and scaling the overall maximum flow rate limit by a proportionality factor determined as a ratio of the local demand value of the flow to the global demand value of the flow.

7. The method of claim 5, wherein calculating the local utilization limit for each flow further comprises calculating a local burst size limit for the application traffic in the flow.

8. The method of claim 1, wherein controlling the buffering of the aggregated application traffic toward the application instance comprises prioritizing the in-policy traffic over the out-of-policy traffic, including emptying one or more delay buffers toward the application instance according to a prioritization scheme that in general imposes shorter buffering delays on the in-policy traffic as compared to the out-of-policy traffic.

9. The method of claim 8, further comprising further prioritizing the aggregated application traffic in the one or more delay buffers according to one or more service parameters defined in respective Service Level Agreements (SLAs) associated with individual ones of the flows, so as to meet one or more minimum application traffic parameters defined for the flows in one or more of the SLAs.

10. The method of claim 1, wherein said marking step further includes a policing step that includes throttling or selectively dropping application messages within the application traffic in each flow, as needed to maintain compliance with maximum service levels guaranteed in a corresponding Service Level Agreement (SLA) known for the flow.

11. An apparatus for controlling a utilization of a software application by an individual client, wherein the application is implemented as a number of peer application instances that receive application traffic from any one or more clients among a plurality of clients and wherein the apparatus is implemented at each application instance and comprises processing circuitry and an associated memory storing computer program instructions that, when executed by the processing circuitry, configure the processing circuitry as:
a distributed traffic controller configured to classify the application traffic incoming to the application instance into flows corresponding to different ones of the clients and/or different types of application traffic and estimate a local demand value for each flow with respect to the application instance; and
a communication controller configured to exchange local demand information with one or more other ones of the application instances, including sending the local demand values estimated at the application instance for the flows at the application instance and receiving like estimated local demand values for all like flows at the other application instances; and
wherein said distributed traffic controller is further configured to:
determine a global demand value for each flow with respect to the application, based on the exchanged local demand information;
calculate a local utilization limit for each flow as a function of the global demand value determined for the flow;
mark the application traffic in each flow as being out-of-policy traffic or as being in-policy traffic, in dependence on whether or not the local utilization limit for the flow is exceeded;
determine whether an aggregation of the application traffic of all the flows at the application instance exceeds a local aggregated utilization limit; and
control a buffering of the aggregated application traffic toward the application instance on a per-flow and/or aggregated flow basis, based on whether the local aggregated utilization limit is exceeded and distinguishing between in-policy and out-of-policy traffic.

12. The apparatus of claim 11, wherein the distributed traffic controller is configured to cooperate with the communication controller to exchange the local demand information by communicating with the one or more other ones of the application instances via a gossip-based anti-entropy protocol that propagates the local demand values as estimated at any one of the application instances to all other ones of the application instances.

13. The apparatus of claim 11, wherein the distributed traffic controller is configured to estimate the local demand value for each flow by at least one of: counting a number of protocol sessions active at the application instance for the flow; estimating an expected flow rate of the flow based on whether any new application traffic has been received in the flow within a defined interval; and estimating the expected flow rate of the flow based on measuring an arrival rate of the application traffic in the flow.

14. The apparatus of claim 11, wherein the distributed traffic controller is configured to determine the global demand value for each flow by summing the local demand value estimated for the flow at the application instance with the local demand values estimated for all like flows at the other application instances, as known from the exchanging of the local demand information.

15. The apparatus of claim 11, wherein the distributed traffic controller is configured to calculate the local utilization limit for each flow by calculating a local flow rate limit for the flow.

16. The apparatus of claim 15, wherein the distributed traffic controller is configured to calculate the local flow rate limit for the flow by calculating the local flow rate limit as an overall maximum flow rate limit known for the flow with respect to the application, as scaled by a proportionality factor that is determined as a ratio of the local demand value of the flow to the global demand value of the flow.

17. The apparatus of claim 15, wherein the distributed traffic controller is configured to calculate the local utilization limit for each flow further by calculating a local burst size limit for the flow.

18. The apparatus of claim 11, wherein the distributed traffic controller is configured to control the buffering of the aggregated application traffic toward the application instance by buffering the aggregated application traffic in one or more delay buffers and emptying the one or more delay buffers toward the application instance according to a prioritization scheme that in general imposes shorter buffering delays on the in-policy traffic as compared to the out-of-policy traffic.

19. The apparatus of claim 18, wherein the distributed traffic controller is further configured to prioritize any aggregated application traffic in the one or more delay buffers according to one or more service parameters defined in respective Service Level Agreements (SLAs) associated with individual ones of the flows at the application instance, so as to meet one or more minimum application traffic parameters defined in one or more of the SLAs.

20. The apparatus of claim 11, wherein, in conjunction with marking the application traffic in each flow as being in-policy traffic or out-of-policy traffic, said distributed traffic controller is further configured to throttle or selectively drop application messages within each flow, as needed to maintain compliance with maximum service levels guaranteed in a corresponding Service Level Agreement (SLA) known for the flow.

* * * * *